(12) United States Patent
Niemela et al.

(10) Patent No.: US 7,333,793 B2
(45) Date of Patent: Feb. 19, 2008

(54) METHOD FOR PERFORMING PACKET SWITCHED HANDOVER IN A MOBILE COMMUNICATION SYSTEM

(75) Inventors: Tuomas Niemela, Helsinki (FI); Kari P. Kauranen, Helsinki (FI); Miikka Huomo, Vantaa (FI)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 10/816,931

(22) Filed: Apr. 5, 2004

(65) Prior Publication Data

US 2005/0185619 A1    Aug. 25, 2005

(30) Foreign Application Priority Data

Feb. 23, 2004    (FI) .................................. 20040280

(51) Int. Cl.
*H04B 1/16* (2006.01)
*H04Q 7/20* (2006.01)

(52) U.S. Cl. .............. 455/336; 455/339; 455/442; 370/331

(58) Field of Classification Search ............... 455/410, 455/411, 436, 437, 438, 439, 442; 380/270, 380/273; 370/329, 331, 349, 389, 395
See application file for complete search history.

(56) References Cited

U.S. PATENT DOCUMENTS 6,137,783 A    10/2000    Sallberg
6,466,556 B1 *    10/2002    Boudreaux ................. 370/331
6,469,992 B1 *    10/2002    Schieder ..................... 370/329
6,535,979 B1 *    3/2003    Vialen et al. ............... 713/163
7,065,340 B1 *    6/2006    Einola et al. ............... 455/410
2002/0066011 A1    5/2002    Vialen et al.
2002/0115460 A1    8/2002    Rune et al.
2003/0091011 A1    5/2003    Roberts et al.
2004/0077349 A1    4/2004    Barak et al.
2004/0120277 A1    6/2004    Holur et al.

FOREIGN PATENT DOCUMENTS

EP        0 978 958 A1    2/2000
WO    WO 01/35586 A1    5/2001

OTHER PUBLICATIONS

International Search Report for International Application No. PCT/FI 000107.

* cited by examiner

*Primary Examiner*—Tony T. Nguyen
(74) *Attorney, Agent, or Firm*—Squire, Sanders & Dempsey L.L.P.

(57) ABSTRACT

The invention relates to a method and system for performing packet switched handover in a mobile communication network. The system comprises a mobile node, a first and a second packet switching node. The method enables the parallel sending of logical link layer frames from the first and the second packet switching node. This is achieved so that the mobile node does not reject incoming frames received from two logical link layer entities having different states. The benefits of the invention are related to improved quality of service and the avoiding of gaps in received data during handover.

19 Claims, 17 Drawing Sheets

METHOD FOR PERFORMING PACKET SWITCHED HANDOVER IN A MOBILE COMMUNICATION SYSTEM

BACKGROUND OF THE INVENTION

1. Field of the Invention

The invention relates to mobile communication systems. Particularly, the invention relates to the performing of packet switched handover in a mobile communication system.

2. Description of the Related Art

The introduction of conversational and streaming services in Global System of Mobile Communications (GSM) has created a demand for efficient handovers from user perspective in GSM/Edge Radio Access Network (GERAN). The General Packet Radio Service (GPRS) and the IP Multimedia System (IMS) support the conversational and streaming services on their side and impose requirements on the GERAN side. It is necessary to be able to perform Packet Switched (PS) handovers frequently enough and to be able to minimize interruptions in a constant packet stream to a mobile terminal. The interruptions must preferably be short enough to enable a packet buffering mechanism in the mobile terminal to hide the interruptions. Previously in GPRS it was sufficient to provide a loss-free link layer service for interactive applications such as Wireless Application Protocol (WAP) browsing. In browsing applications moderate extra delays caused by handovers are acceptable. However, in streaming or conversational class services interruptions in the supposedly constant packet stream are immediately noticeable unless, of course, they can be hidden using large enough buffers in the receiving ends. However, such buffering introduces always a delay in the media streams provided to the user. In the case of conversational voice services any significant delays are unallowable, especially considering other factors already introducing a delay in the speech path such as noise filtering and speech coding.

Reference is now made to FIG. 1, which is a block diagram illustrating the architecture and the protocol stacks in a GPRS system in association with the GERAN. The GPRS system is specified, for example, in the 3GPP specification 23.060. The protocol stacks are illustrated from the user plane point of view. In FIG. 1 there is a Gateway GPRS Support Node (GGSN) 106. GGSN 106 is connected to an external network (not shown) via a Gi interface. The external network may be an arbitrary IP network, for example, the Internet or an intranet. In FIG. 1 there is also a Serving GPRS Support Node (SGSN) 104. GGSN 106 communicates with SGSN 104, which routes packets to and from Mobile Station (MS) 100 via a Base Station Subsystem (BSS). SGSN 104 takes care of the mobility related tasks such as the maintaining of mobile station 100 location information, network registrations, routing area and location updating, Packet Data Context (PDP) activation and deactivation, handovers and the paging of mobile station 100. Part of the above mentioned tasks are naturally done in other network elements with which SGSN 104 is communicating. The GGSN is responsible for routing and tunneling packets to and from a number of SGSN 104 and other SGSNs. The routing is based on SGSN address information maintained in a PDP context information held by GGSN 106 for each network address activated for MS 100, for example, an IP address or an X.25 address or a PPP link.

In FIG. 1, the uppermost protocol layer in MS 100 is the application layer (APPL). The application layer may be any protocol, for example, a WAP protocol or Transmission Control Protocol (TCP) or Universal Datagram Protocol (UDP). Over TCP/IP may be carried, for example, Hypertext Transfer Protocol (HTTP). The application layer communication is exchanged with a peer host, which may be located behind the Gi interface, for example, in the Internet. Below the application layer there is the IP layer or alternatively X.25 layer, which in GPRS is supported by both MS 100 and GGSN 106. The IP address for packets addressed to MS 100 points to GGSN 106. An IP packet 114 is conveyed to MS 100 using GPRS user plane protocols below the IP layer. Between GGSN 106 and SGSN 104 IP packet 114 is conveyed using the GPRS Tunneling Protocol (GTP). A GTP packet carried further over UDP/IP.

In SGSN IP packet 114 data is routed based on MS 100 location information and passed to Sub-Network Dependent Convergence Protocol (SNDCP) layer. SNDCP is specified in the 3GPP specification 44.065. SNDCP layer maps network-level characteristics onto the characteristics of the underlying network. For example, SNDCP takes care of the transmission and reception of Network layer Protocol Data Units (N-PDU) carrying IP packets. For example, IP packet 114 is carried in N-PDU 112. SNDCP multiplexes several packet data protocol packets for the same MS. It segments IP packet 114 to LLC frames, for example, LLC frame 110. It also reassembles packets from LLC frames. Header compression and packet payload compression is also performed at SNDCP layer. SNDCP performs parameter negotiation between MS 100 and SGSN 104. SNDCP buffers N-PDUs in the case of acknowledged mode services.

The Logical Link Control (LLC) layer provides a highly reliable link between MS 100 and SGSN 104. The LLC is specified in 3GPP specifications 44.064 and 04.64. The LLC is independent of the underlying radio protocols and hides the BSS and radio interface related tasks from the LLC layer users. LLC supports variable-length information frames. LLC supports both acknowledged and unacknowledged data transfers, that is, acknowledged and unacknowledged modes of operation. LLC provides services typical to a link layer comprising parameter negotiation, flow control in the Asynchronous Balanced Mode (ABM), sequence control to maintain the ordering of LLC-frames, expedited delivery for high-priority data, error detection, error recovery and indication. LLC performs data confidentiality by means of the ciphering of LLC-frame contents. LLC also supports user identity confidentiality by means of the use of Temporary Logical Link Identity (TLLI) instead of International Mobile Subscriber Identity (IMSI).

The relay layer relays LLC PDUs between the Um and Gb interfaces in the BSS. The Base Station System GPRS Protocol (BSSGP) layer specified in 3GPP specification 08.18 conveys routing and QoS-related information between the BSS and the SGSN. For example, it carries radio resource related requests from the SGSN to the BSS 102. It also carries LLC frames between the BSS and the SGSN. In addition to LLC frames it also carries signaling PDUs associated with GRPS mobility management. The Network Service (NS) layer transports BSSGP PDUs between BSS and SGSN. NS may be based on Frame Relay (FR). The RLC sub-layer within the RLC/MAC layer provides a radio technology dependent reliable link between MS 100 and BSS 102. The MAC sub-layer performs the requesting and reservation of radio resources and maps LLC frames onto the GSM physical channels. The task of the MAC layer is to ensure efficient sharing of common radio resources by several mobile stations. The RLC/MAC layer is defined in the 3GPP specification GSM 04.60.

The standardization organization 3G Partnership Project (3GPP) is currently specifying the packet switched handover for GERAN A/Gb mode. One of the key aspects of the packet switched handover is duplicated packet forwarding to both a source BSS and a target BSS during handover, which has not yet been thoroughly covered in the specifications.

Reference is now made to FIG. 2, which is a block diagram of GPRS architecture illustrating problems in prior art associated with duplicated packet forwarding. According to current GPRS specifications, an LLC entity in a new SGSN can only be started so that an LLC connection is establishing at the request of an SNDCP entity or the peer LLC entity. An LLC entity can only be created in its initial state where the LLC connection variables have their initial values. In FIG. 2 there is an MS 100, Base Transceiver Stations (BTS) 224-228 and Base Controller Stations (BSC) 210-214 in BSS 216. There is a GGSN 200, which is connected to IP network 201. From IP network 201 is received a downlink packet stream 246 for which a real-time service is required. Initially, downlink packet stream 246 is tunneled to SGSN 202 as packet stream 240. Initially, SGSN 202 routes packet stream 240 to MS 100 via BSC 212 and BTS 222 as packet stream 242 using an LLC connection terminating at an LLC entity 230, which is located in MS 100. BSC 212 and BTS 222 are referred to as source BSS 262. MS 100 communicates with BSC 212 via BTS 222. BSC 212 performs handover related tasks including the handover determination algorithms and decisions. In handover related signaling an SGSN communicates with a BSC within a BSS. Similarly, in handover related signaling an MS communicates with a BSC within a BSS. The signaling between an MS and a BSC goes via a BTS.

However, when MS 100 receives a report indicating that a cell served by BTS 224 has better radio quality, it must start performing handover to the cell served by BTS 224. The new cell is under the area of a new SGSN 204. After the handover, packet stream 246 should be routed to MS 100 from GGSN 200 via SGSN 204, BSC 214 and BTS 224. BSC 214 and BTS 224 are also referred to as a target BSS 264. While the handover is not fully complete, SGSN 202 must forward packets to both BSC 212 and SGSN 204. In order to be able to process packets from packet stream 240 SGSN 204 must receive them as a GTP tunneled packet stream 241 from SGSN 202. Packets from GTP tunneled packet stream 241 are forwarded in SGSN 204 to its LLC entity 254. The LLC entity is started from initial state with initial LLC connection variables. GTP tunneled packet stream 241 is routed from SGSN 204 as packet stream 244 carried over an LLC connection. The problem in the packet duplicated forwarding mechanism described above is that LLC entity 254 in the new SGSN, namely SGSN 204, has different state compared to LLC entity 252 and LLC entity 230. This means that LLC entity 230 in MS 100 receives packets from two different independent LLC entities. The corresponding peer LLC entity 230 in MS 100 is not capable of receiving simultaneously packets from two different LLC entities, if the states of the LLC entities comprising the LLC variables are not synchronized. The different states essentially lead to the rejection of LLC frames carrying packet stream 244 or the receiving of duplicate LLC frames in an uncontrolled manner.

The rejection is due to the fact that LLC entity 252 sends LLC frames with sequence numbers that are overlapping with the sequence numbers sent by LLC entity 254 even though they are different LLC frames. Frames are rejected in LLC entity 230 also due to the fact that LLC entity 254 sends LLC frames using different ciphering parameters. Because the ciphering parameters are different, LLC entity 230 is unable to decipher the LLC frames and discards them due to failing Frame Check Sequence (FCS) verification. A further problem is that SGSN 204 is unaware of the LLC frame sizes negotiated between MS 100 and SGSN 202. If SGSN 204 uses values that exceed the maximum values supported by MS 100, it discards all LLC frames. This in turn may lead to the releasing of the PDP context carrying packets streams 240, 241, 242 and 244. MS 100 may additionally also perform reset.

As explained in the 3GPP specification 44.064, the ciphering parameters for LLC frames comprise IOV, LFN, OC and SX. IOV is an Input Offset Value, which is a 32 bit random value generated by the SGSN. LFN is the LLC Frame Number (LFN) in the LLC frame header. OC is an overflow counter that is calculated and maintained independently at the sending and the receiving sides. An OC for acknowledged operation must be set to 0 whenever asynchronous balanced mode operation is re-established for the corresponding Data Link Connection Identifier (DLCI). An LLC layer connection is identified using DLCI, which consists of Service Access Point Identifier (SAPI) and the TLLI associated with MS 100. OC shall be incremented by 512 every time when the corresponding LFN rolls over. Due to this fact, OC is never sent directly in LLC frames. The aim of OC is to add variation to the ciphering process in order to make it more robust. SX is an XOR mask calculated from the LLC entity identifier. There are two IOV values, one for numbered information frames associated with acknowledged operation and another for unconfirmed information frames associated with unacknowledged operation. There are also two LFN values, one for acknowledged operation and another for unacknowledged operation. There are four OC counters associated with each DLCI. There is one OC counter per operation mode, which is either unacknowledged or acknowledged, and direction of transmission, which is either uplink or downlink.

Naturally, the session key $K_c$ used in the ciphering algorithm is one of the ciphering parameters.

Reference is now made to FIG. 3, which is a signaling diagram illustrating signaling during a packet switched handover in accordance with the current 3GPP proposals. The current proposals are described in TSG document GP-032710 "Packet Switched Handover for GERAN A/Gb mode, Stage 2", version 0.2.0, 2004-01. The architecture associated with the signaling is as illustrated in FIG. 2. MS 100 sends radio quality measurement information pertaining to neighboring cells to source BSS 262 using message 301. Based on the measurement information source BSS 262 determines that handover is required. At time $t_0$ source BSS 262 determines that handover is to be performed to a new cell, which is in the area of a new SGSN, which is SGSN 204. Source BSS 262 sends a PS Handover Required message 302 to old SGSN 202. The message comprises, for instance, the source cell, the target cell, TLLI, cause and a transparent container. SGSN 202 determines based on the target cell if the handover is an intra- or inter-SGSN handover. SGSN 202 determines the identity of the new SGSN and sends a Prepare PS Handover Request message 303 to SGSN 204. SGSN 204 sends a PS Handover Required message 304, which requests target BSS 264 to reserve radio resources for MS 100 in the target cell. When radio resources have been successfully allocated, target BSS 264 sends a PS Handover Request Acknowledge message 305 indicating successful allocation. SGSN 204 sends a Prepare PS Handover Response message 306 to SGSN 202, which tells, among other things, that SGSN 202 may issue to MS 100 a command to complete handover to the new cell. SGSN 202 receives message 306 at time $t_1$.

However, simultaneously a packet from GTP packet stream 307 is received by SGSN 202. SGSN 202 forwards packets one by one from GTP packet stream 307 to SGSN 204 as packet stream 308. SGSN 204 sends packets from packet stream 308 further to target BSS 264 as packet stream 309. Target BSS forwards packets from packet stream 308 to MS 100 as packet stream 310. There is a delay before MS 100 is able to receive packets from SGSN 204 via target BSS 264. SGSN 202 sends PS Handover Command message 311 to source BSS 262. Source BSS sends further PS Handover Command message to MS 100. Thereupon, MS 100 tunes to the radio channel and timeslot allocated in the target cell by target BSS 264. This is illustrated using arrow 312. Target BSS 264 sends Physical information to MS 100 for MS 100 to synchronize. After MS 100 has synchronized, it sends a PS Handover Complete message 314 to target BSS 264 at time $t_2$. Only after time $t_2$ MS 100 is prepared to receive packets via target BSS 264 normally, which shows that there is an intolerable delay unless MS 100 receives packets via both target BSS 264 and source BSS 262. Target BSS 264 sends a PS Handover Complete message 315 to SGSN 204. Thereupon, SGSN 204 performs PDP context update messaging represented using arrows 316 and 317 with GGSN 200. PDP context update indicates to GGSN 200 the address of current SGSN 204. After having received PDP context update at time $t_3$, GGSN 200 is able to start routing GTP packet stream 318 to right SGSN, which is now SGSN 204. Thereupon, MS 100 receives packet stream 320 from target BSS 264, which has received it from SGSN 204 as packet stream 319.

Reference is now made to FIG. 4, which is signaling diagram illustrating the delay associated with a solution, which merely forwards packets from a source node to a target node during handover processing. The solution is similar to the solution utilized in UMTS in association with Serving Radio Network Server SRNS relocation. SRNS relocation is explained in 3GPP 23.060. In FIG. 4 a source node 452 receives a packet stream 401 sent by an upper node 450, which is connected to an IP network 451. At time $t_0$ upper node sends a specific packet 460 in packet stream 401. Source node forwards packet stream further 402 to MS 100 via an access network 456. At time $t_1$ MS 100 decides to start using a target node 454 instead of source node 452 for receiving packet streams. At time $t_1$ MS 100 acknowledges last frame received via source node 452 using message 403. Packet 460 has not been completely received, for example the last frame from packet 460 may be pending. MS 100 sends a request message 403 for source node 452 indicating the abandoning of source node 452 for MS 100 traffic. After receiving message 403, source node 452 starts forwarding all packets addressed to MS 100 via target node 454 as packet stream 405. Packet stream 405 is forwarded by target node 454 to MS 100 as packet stream 406. At time $t_2$ MS 100 receives a first packet since MS 100 received the last frame via source node 452 at time $t_1$. The time difference between $t_1$ and $t_2$ represents the gap in the receiving of packets at MS 100, whereas the time difference between $t_0$ and $t_2$ represent a delay in receiving packet 460 from upper node 450 to MS 100. The delays explained above are intolerable for realtime services.

As has been illustrated in association with FIGS. 2, 3 and 4, there are problems in performing packet switched handover using current GPRS architecture and the solutions proposed in prior art. On the one hand, it must be possible for an MS to receive packets simultaneously from a source node and a target node during the handover signaling. On the other hand, this is not possible in current GPRS specifications and leads to the rejection of forwarded frames at the MS side.

SUMMARY OF THE INVENTION

The invention relates to a method of performing handover in a mobile communication system comprising a mobile node, a first and a second packet switching node. In the method a handover condition associated with the mobile node is detected in the first packet switching node; the first packet switching node requests handover preparation from the second packet switching node; logical link layer information is received from the first packet switching node to the second packet switching node; the state in a logical link layer entity is set in the second packet switching node based on the logical link layer state information; and logical link layer frames are sent from the first and second packet switching nodes to the mobile node during handover.

The invention relates also to a method performing handover in a mobile communication system comprising a mobile node, a first and a second packet switching node. In the method a handover condition associated with the mobile node is detected in the first packet switching node; the first packet switching node requests handover preparation from the second packet switching node; a packet is received at the first packet switching node; a logical link layer Protocol Data Unit (PDU) is formed from data in the packet; a first frame containing the logical link layer Protocol Data Unit (PDU) is sent to the mobile node from the first packet switching node; the logical link Protocol data Unit (PDU) is sent from the first packet switching node to the second packet switching node; and a second frame containing the logical link layer Protocol Data Unit (PDU) is sent to the mobile node from the second packet switching node.

The invention relates also to a method performing handover in a mobile communication system comprising a mobile node, a first and a second packet switching node. In the method a handover condition associated with the mobile node is detected in the first packet switching node; the first packet switching node requests handover preparation from the second packet switching node; at least one ciphering parameter is received from the first packet switching node to the second packet switching node; a logical link parameter exchange is performed between the mobile node and the first packet switching node; and logical link layer frames are sent from the first and second packet switching nodes to the mobile node during handover.

The invention relates also to a method performing handover in a mobile communication system comprising a mobile node, a first and a second packet switching node. In the method a first logical link layer entity is formed in the mobile node; a handover condition is detected in the mobile node; a second logical link layer entity is formed in the mobile node; logical link layer frames are sent from the first and second packet switching nodes to the mobile node during handover; handover completion is detected; and logical link layer parameters between the mobile node and the second packet switching node are renegotiated after the detecting of the handover completion if the logical link layer parameters are not suitable.

The invention relates also to a system, which comprises a mobile node, a first and a second packet switching node. The system further comprises: signaling means in the first packet switching node for detecting a handover condition associated with the mobile node, requesting handover preparation from the second packet switching node and sending logical link layer information to the second packet switching node; signaling means in the second packet switching node for receiving logical link layer information from the first packet switching node; control means in the second packet switching node arranged to set the state in a logical link layer entity based on logical link layer information from the first packet switching node; and control means in the first packet switching node arranged to send logical link layer frames to the mobile node during handover.

The invention relates also to a system, which comprises a mobile node, a first and a second packet switching node. The system further comprises: signaling means in the first packet switching node for detecting a handover condition associated with the mobile node and requesting handover preparation from the second packet switching node; logical link layer means in said first packet switching node for forming logical link layer Protocol Data Units (PDU) and sending said logical link layer Protocol Data Units (PDU) to said second packet switching node; and logical link layer means in said second packet switching node for sending said logical link layer Protocol Data Units (PDU) transparently to said mobile node.

The invention relates also to a system, which comprises a mobile node, a first and a second packet switching node. The system further comprises: signaling means in the first packet switching node for detecting a handover condition associated with the mobile node, requesting handover preparation from the second packet switching node and sending at least one ciphering parameter to the second packet switching node; signaling means in the second packet switching node for receiving at least one ciphering parameter from the first packet switching node; logical link layer means in the first packet switching node for performing a logical link parameter exchange with the mobile node.

The invention relates also to a system, which comprises a mobile node, a first and a second packet switching node. The system further comprises: control means in the mobile node arranged to form a first logical link layer entity in response to connection establishment and a second logical link layer entity in response to a handover condition; signaling means in the mobile node for detecting the handover condition and a handover completion; logical link layer means in the mobile node arranged to renegotiate logical link layer parameters with the second packet switched node after the handover completion if the logical link layer parameters are not suitable.

In one embodiment of the invention, the mobile node is a mobile terminal, for example, a UMTS terminal, a GSM terminal, a GPRS terminal, a WLAN terminal or a terminal within an arbitrary cellular radio system.

In one embodiment of the invention, the mobile node is a mobile computer, for example, a laptop computer, palmtop computer or a personal digital assistant (PDA).

In one embodiment of the invention, the mobile communication system is a General Packet Radio Service (GPRS), the first and second packet switching nodes are Serving GPRS Support Nodes (SGSN) and the logical link layer is GPRS Logical Link Control (LLC) and the logical link parameter exchange is Logical Link Control (LLC) exchange Identification (XID) negotiation. In one embodiment of the invention the second packet switching node is a Base Station Subsystem (BSS) node, for example, a base station controller or a base station. In one embodiment of the invention, the first or the second packet switching node is a node, which performs the forwarding and switching of data packets at link layer. The invention is not restricted to packet switching nodes that switch packets at network layer level in the manner of e.g. IP routers. By packets are meant herein throughout this disclosure data packets pertaining to any protocol layer, for example, network layer packets, link layer frames, Asynchronous Transfer Mode (ATM) cells.

In one embodiment of the invention, the logical link parameter exchange is performed in response to the detection of handover condition at the first packet switching node.

In one embodiment of the invention, the first logical link layer entity in the mobile node is removed after the detecting of handover completion.

In one embodiment of the invention, the at least one ciphering parameter is received from the first packet switching node to the second packet switching node when the first packet switching node requests handover preparation from the second packet switching node. This means that the at least one ciphering parameter is sent from the first packet switching to the second packet switching in the message that requests handover preparation.

In one embodiment of the invention, the logical link layer information is received from the first packet switching node to the second packet switching node when the first packet switching node requests handover preparation from the second packet switching node. This means that the logical link layer information is sent from the first packet switching node to the second packet switching in the message that requests handover preparation.

In one embodiment of the invention, the logical link parameter exchange is performed in response to the condition where the mobile node receives an LLC frame, which has a duplicate flag set. The duplicate flag indicates the duplication of the LLC frame for handover purposes. In one embodiment of the invention, the duplicate flag is only accepted by the mobile node while handover is being performed. Otherwise, the receiving of the flag results in an error indication to the peer LLC-entity.

In one embodiment of the invention, the logical link layer means in the mobile node and in the first and second packet switching nodes are represented by one or many Logical Link Control (LLC) entities, a Logical Link Management Entity (LLME) and a multiplexing entity associated with them. On transmission the multiplexing entity generates and inserts the FCS, performs a frame ciphering function and provides SAPI-based logical link control layer contention resolution between the various logical link entities. The functions performed by multiplexing entity and LLME are described in 3GPP specification 23.060.

In one embodiment of the invention, the control means in the first and second packet switching node comprise the higher protocol layer entities above the logical link layer. For example, in a SGSN the control means may comprise the relay layer entities, the SNDCP layer entities and the GTP layer entities.

In one embodiment of the invention, the control means in the mobile node comprise the higher protocol layer entities pertaining to the GPRS user plane.

In one embodiment of the invention, the signaling means in the mobile node comprise the signaling protocols used to communicate with the first and the second packet switching nodes. In a GPRS mobile terminal the signaling means comprises the GPRS control plane signaling protocol stack entities. In one embodiment of the invention, the actual mobility management and radio control related application logic are performed in control means or in separate control means in association with signaling means. In this embodiment the exchange of signaling messages is handled by separate means reserved for the task.

In one embodiment of the invention, the signaling means in the first and the second packet switching nodes comprise the signaling protocols used to communicate with the mobile node. In a SGSN the signaling means comprises the GPRS control plane signaling protocol stack entities.

In one embodiment of the invention, the sending of logical link layer frames or any other messages between the mobile node and the packet switching nodes is performed via a radio access network so that the frames and messages are forwarded by one or many intermediate network elements such as base station controllers, radio network controllers and base transceiver stations. In one embodiment of the invention, the first and the second packet switching nodes are directly connected to base transceiver stations and manage the radio network control procedures directly.

The benefits of the invention are associated with improved quality of service. With the invention it is now possible to provide a continuous packet stream to a mobile station during handover.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 2:
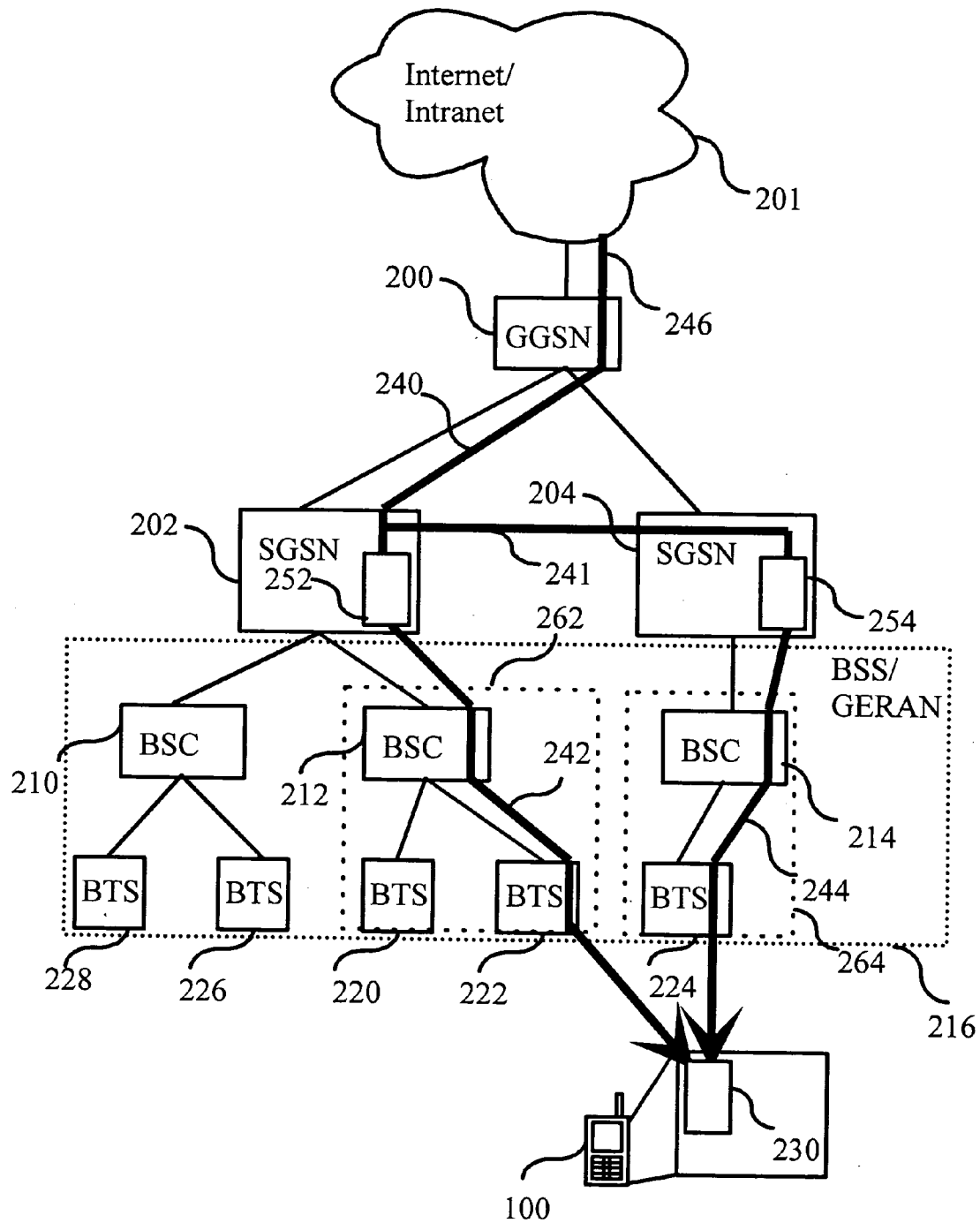
FIG. 2 is a block diagram illustrating General Packet Radio Service (GPRS) network architecture and problems in prior art associated with duplicated packet forwarding.
Figure 5:
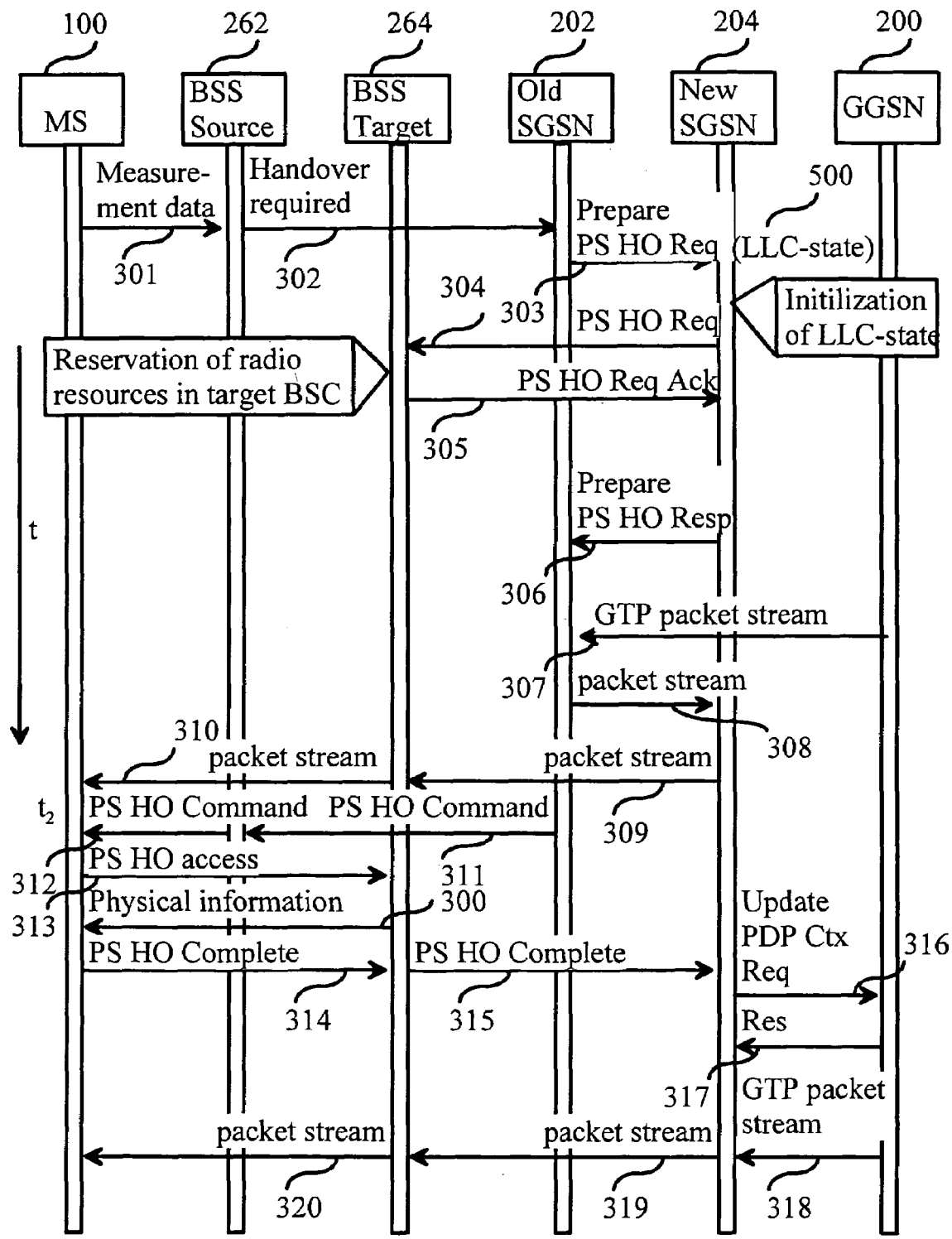
FIG. 5 is a signaling diagram depicting one embodiment of packet switched handover method utilizing state transfer, according to the invention.
Figure 10:
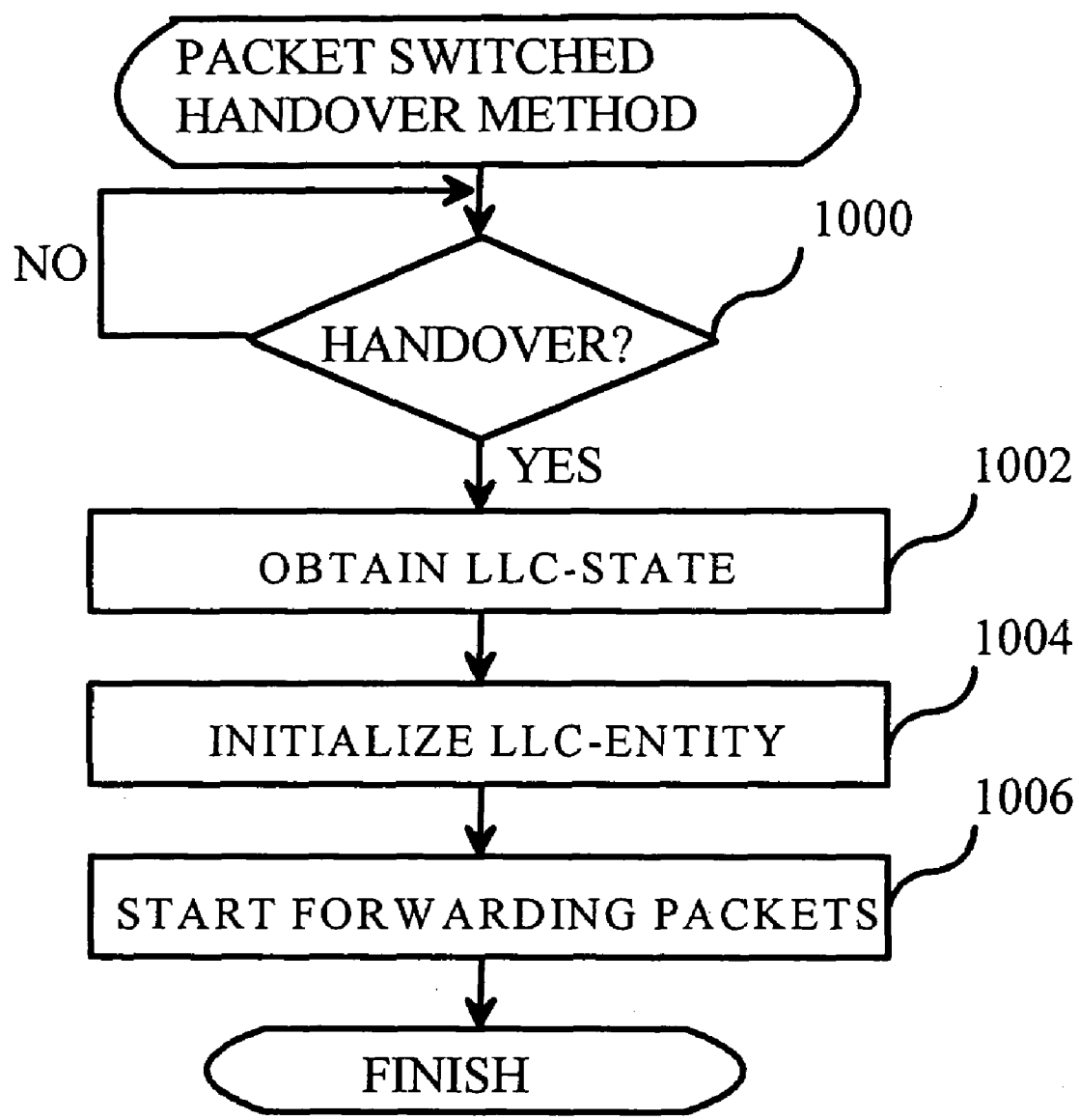
FIG. 10 is a flow chart depicting one embodiment of packet switched handover method utilizing context transfer, according to the invention.

FIG. 10 is a flow chart depicting one embodiment of packet switched handover, which utilizes state transfer using a signaling illustrated in FIG. 5. The signaling is performed in GPRS system architecture, which is illustrated in FIG. 2. At step 1000 it is checked if handover occurs. In case there is handover MS 100 sends radio quality measurement information pertaining to neighboring cells to source BSS 262 using message 301. Based on the measurement information source BSS 262 determines that handover is required. The determination is performed using an algorithm that is executed in a Base Station Controller (BSC) within the source BSS 262. At time $t_0$ source BSS 262 determines that handover is to be performed to a new cell, which is in the area of a new SGSN, which is SGSN 204. Source BSS 262 sends a PS Handover Required message 302 to old SGSN 202. The message comprises, for instance, the source cell, the target cell, TLLI, cause and a transparent container. SGSN 202 determines based on the target cell if the handover is an intra- or inter-SGSN handover. SGSN 202 determines the identity of the new SGSN and sends a Prepare PS Handover Request message 303 to SGSN 204.

Figure 3:
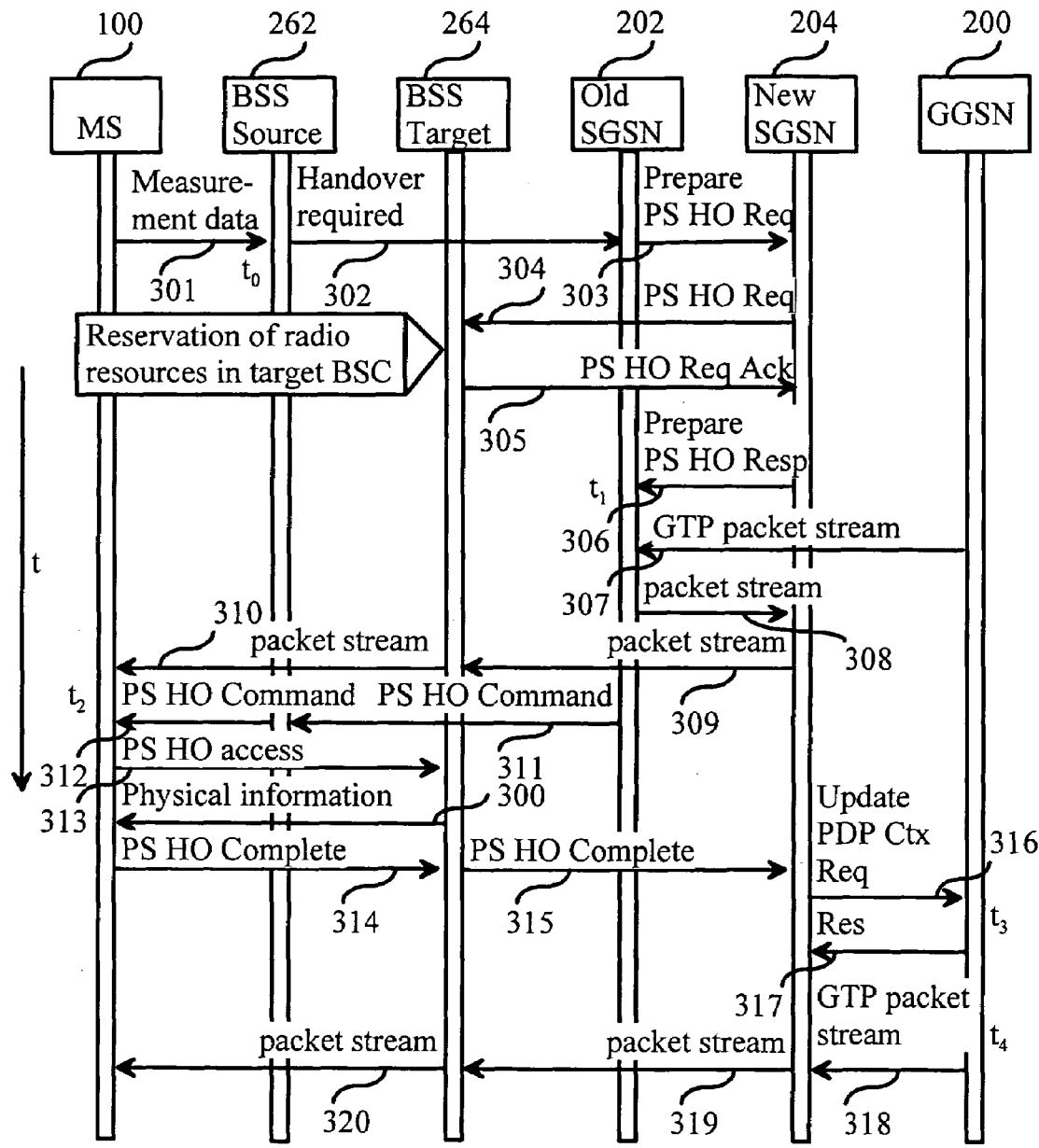
FIG. 3 is a signaling diagram illustrating signaling during a packet switched handover in prior art.
Figure 4:
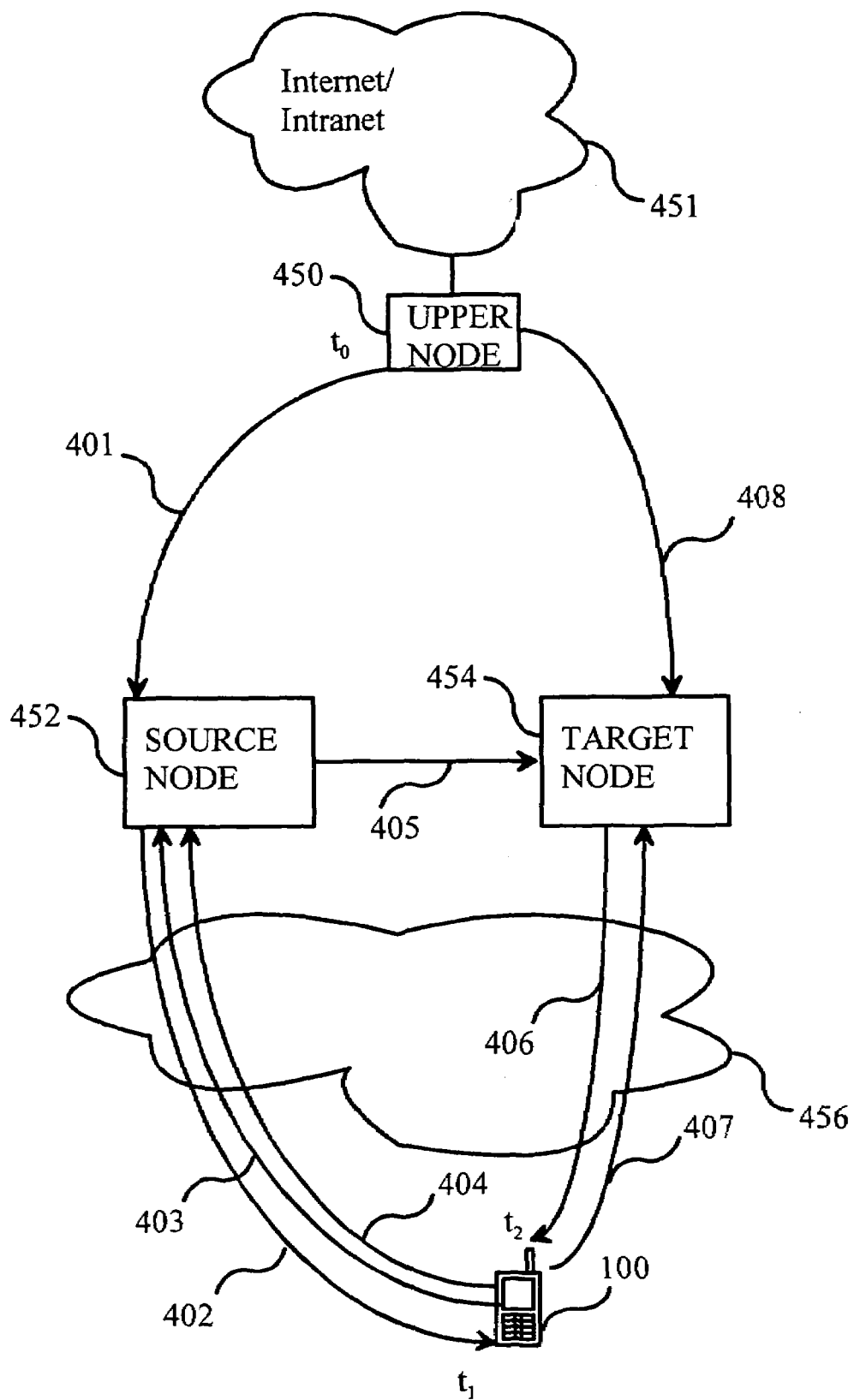
FIG. 4 is a signaling diagram illustrating the delay associated with a solution, which merely forwards packets from a source node to a target node during handover processing.

At step 1002 the state pertaining to the logical link is obtained by the LLC-entity in SGSN 204. This is achieved so that Prepare PS Handover Request message carries LLC state information element 500. LLC state information element 500 comprises information that is used to synchronize LLC-entities in SGSN 202 and SGSN 204. Information element 500 comprises at least the session key $K_c$, the IOV values for both modes of operation, both LFN values and the four OC values. SGSN 204 stores information element 500 until SGSN 202 forwards packets to it. The handover signaling between network elements continues as explained in association with FIG. 3.

At step 1004 when a first forwarded packet is received from SGSN 202, an LLC entity is initialized in SGSN 204. During initialization SGSN 204 uses information element 500. By having information element 500 and the LLC state information in it, it is possible for SGSN 204 to construct an LLC-entity, which is an exact replica of the LLC-entity in SGSN 202 from MS 100 point of view. Thereupon, MS 100 is able to receive LLC frames from both LLC-entities without noticing a difference. In one embodiment of the invention the LLC-entity in SGSN 204 is initialized and started already after SGSN 204 has received message 303 and no packets to be forwarded have yet been received by SGSN 204. At step 1006 SGSN 204 starts forwarding packets received via SGSN 202 using the LLC-entity constructed and initialized at step 1006.

Figure 1:
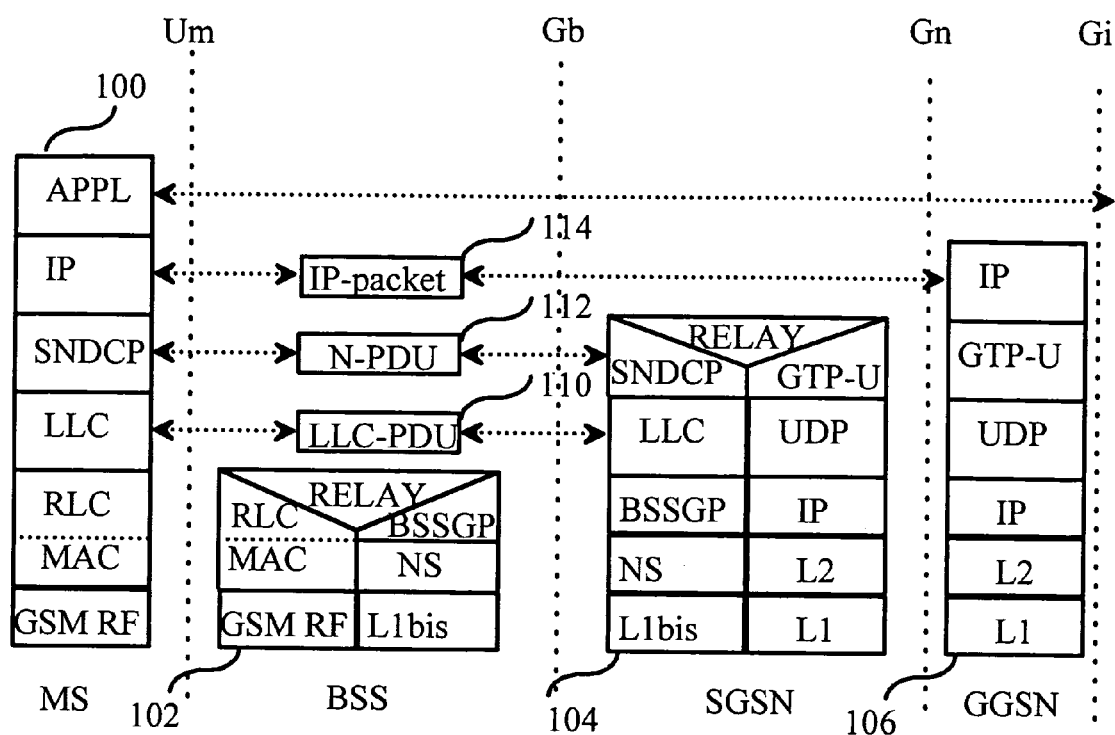
FIG. 1 is a block diagram illustrating the prior art architecture and the protocol stacks in a General Packet Radio Service (GPRS) system in association with the GSM/EDGE Radio Access Network (GERAN)
Figure 6A:
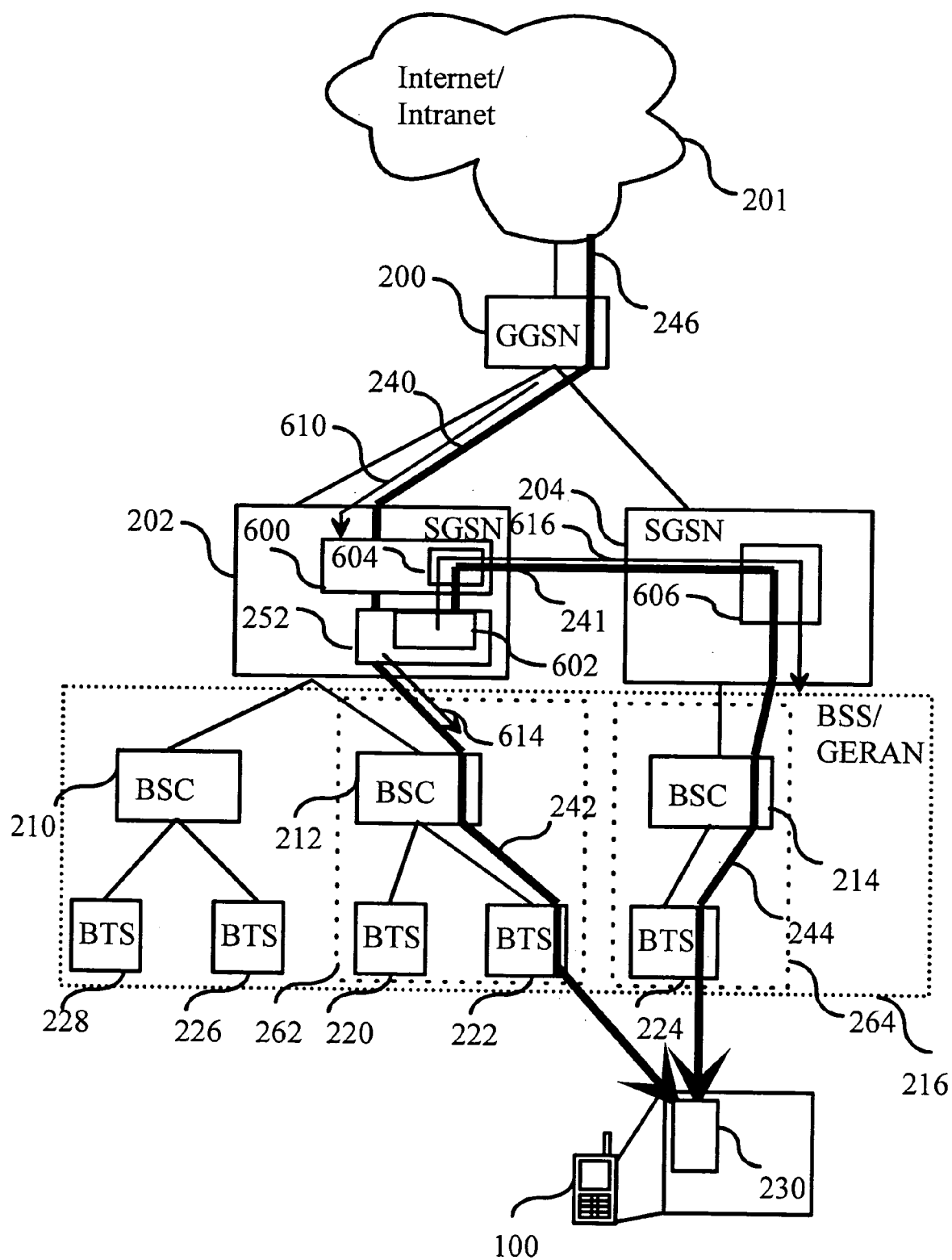
FIG. 6a is a block diagram depicting one embodiment of packet switched handover method utilizing frame forwarding via Serving GPRS Support Node (SGSN), according to the invention.
Figure 6B:
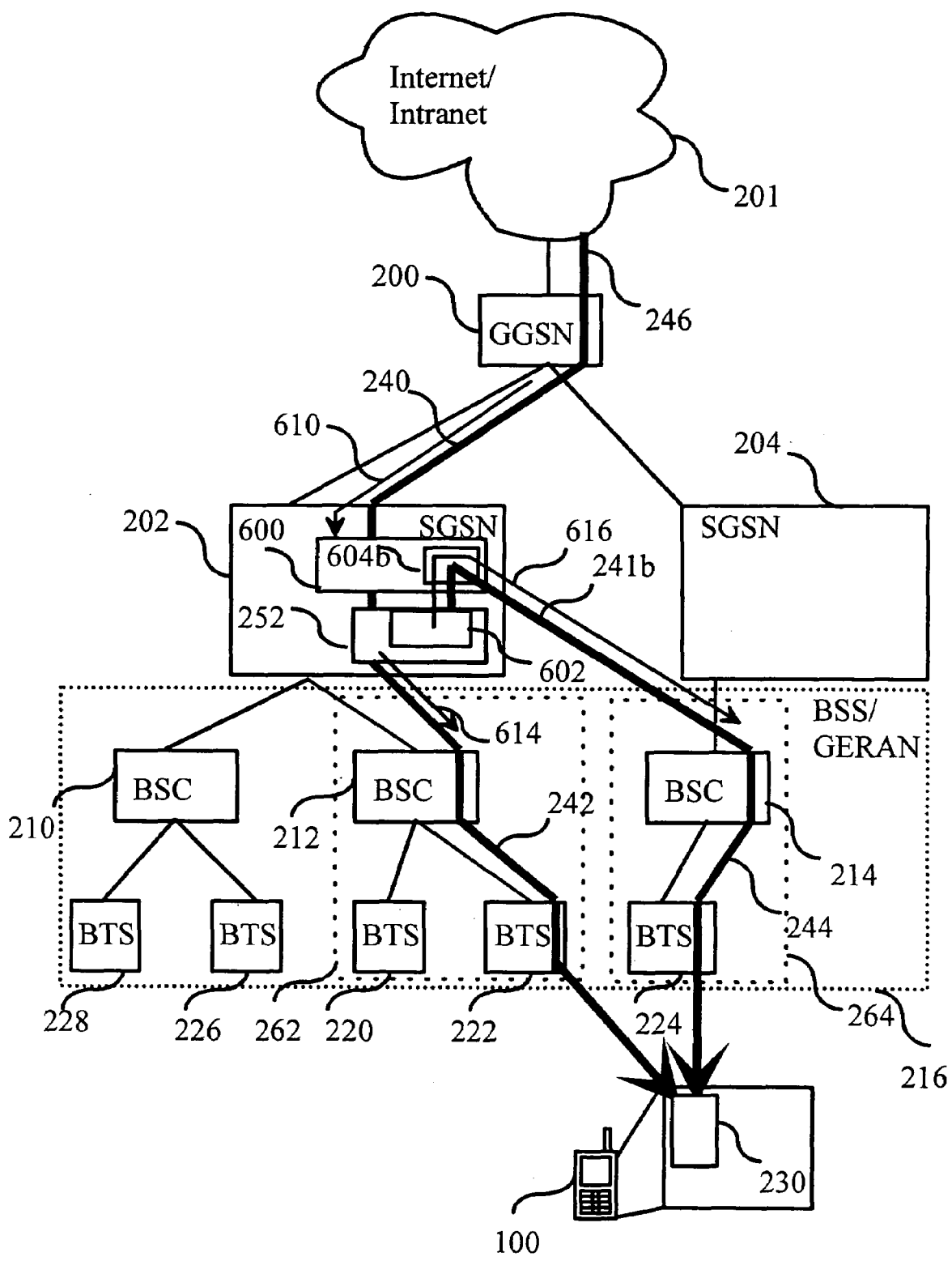
FIG. 6b is a block diagram depicting one embodiment of packet switched handover method utilizing frame forwarding directly to target Base Station Subsystem, according to the invention.
Figure 11:
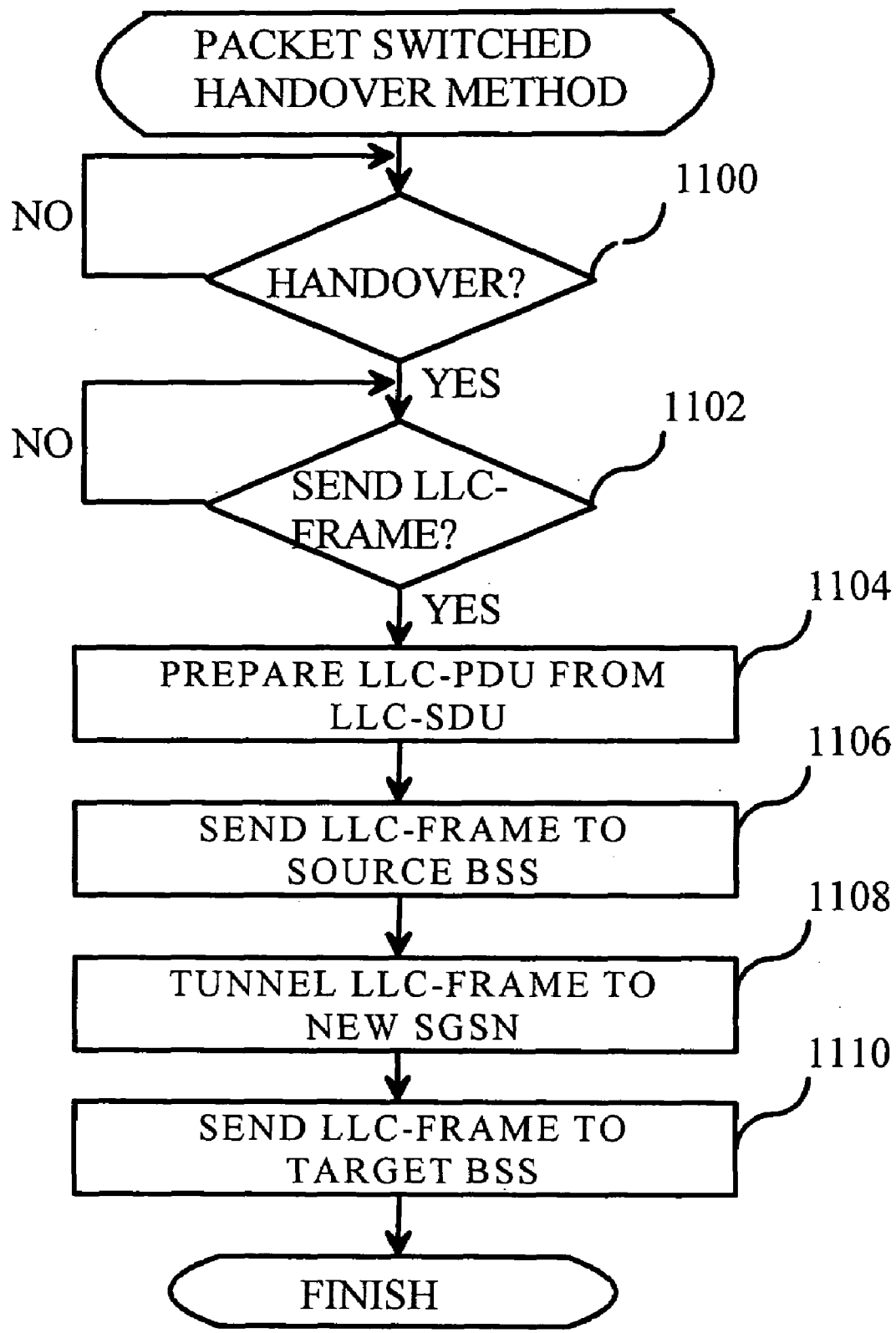
FIG. 11 is a flow chart depicting one embodiment of packet switched handover method utilizing frame forwarding, according to the invention.

FIG. 11 is a flow chart depicting one embodiment of packet switched handover, which utilizes frame forwarding in a system as illustrated in FIG. 6a or 6b. At step 1100 SGSN 202 waits for a message from source BSS 262 indicating that handover is required. In one embodiment of the invention the handover indication may also be received from MS 100. When the message is received method continues in step 1102. At step 1102 SGSN 202 waits for an event where SGSN 202 receives a packet 610 from GGSN 200, which is the first user plane packet after the start of handover. At this event a first LLC frame 614 that carries data from packet 610 is to be sent by SGSN 202. When the event occurs packet 610 is received by an SNDCP entity 600 in SGSN 202 via the GTP and relay layers as illustrated in FIG. 1.

Packet 610 is received to SGSN 202 via tunnel 240. The SNDCP entity 600 performs packet segmentation for packet 610 and other SNDCP level tasks and issues a request to an LLC-entity 252 to send first LLC-frame 614. The request is issued in the form of an LLC Service Data Unit (SDU). At step 1104 LLC-entity 252 prepares an LLC-PDU using the information contained in LLC-SDU and the LLC-entity 252 state variables. At step 1106 LLC-entity 252 sends the prepared LLC-PDU in a first LLC-frame 614 to source BSS 262 and BSC 212 therein.

At step 1108 LLC-entity 252 passes the LLC-PDU in a second LLC-frame 616 to a frame forwarding entity 604 in association with SNDCP entity 600. It should be noted that second LLC-frame 616 is a duplicate of LLC-frame 614. Frame forwarding entity 604 sends the second LLC-frame 616 to SGSN 204 using a connection 241, which tunnels LLC-frames prepared by LLC-entity 252 to SGSN 204. Connection 241 is, for example, a GTP tunnel established between SGSN 202 and SGSN 204 for the transparent forwarding of LLC-frames. The second LLC-frame 616 is received by LLC-entity 606 in SGSN 204. LLC-entity 606 is configured to receive LLC-frames via connection 241 and forward them transparently towards target BSS 264. The transparent forwarding means in this case that the LLC-entity does not alter the LLC-frame fields indicating LLC-entity 252 state. In one embodiment of the invention, relay LLC PDU formed from LLC-frame 616 is not relayed through SNDCP protocol entity in SGSN 204. In another embodiment of the invention the LLC PDU from LLC-frame 616 is relayed through protocol entity chain GTP-SNDCP-LLC-BSSGP in order to be sent to target BSS 264.

In one embodiment of the invention illustrated in FIG. 6b SGSN 202 passes second LLC-frame 616 directly to target BSS 264. This is achieved so that a connection 241b is formed between SGSN 202 and target BSS 264. This is achieved so that at step 1108 is omitted from the method. Instead, at step 1110 LLC-entity 252 passes the LLC-PDU in a second LLC-frame 616 to a frame forwarding entity 604b in association with SNDCP entity 600. Frame forwarding entity 604b sends the second LLC-frame 616 to target BSS 264 using connection 241b. Target BSS 264 is configured to receive LLC-frame 616 and other duplicate LLC-frames for handover and to prepare them for transmission to MS 100.

Figure 7:
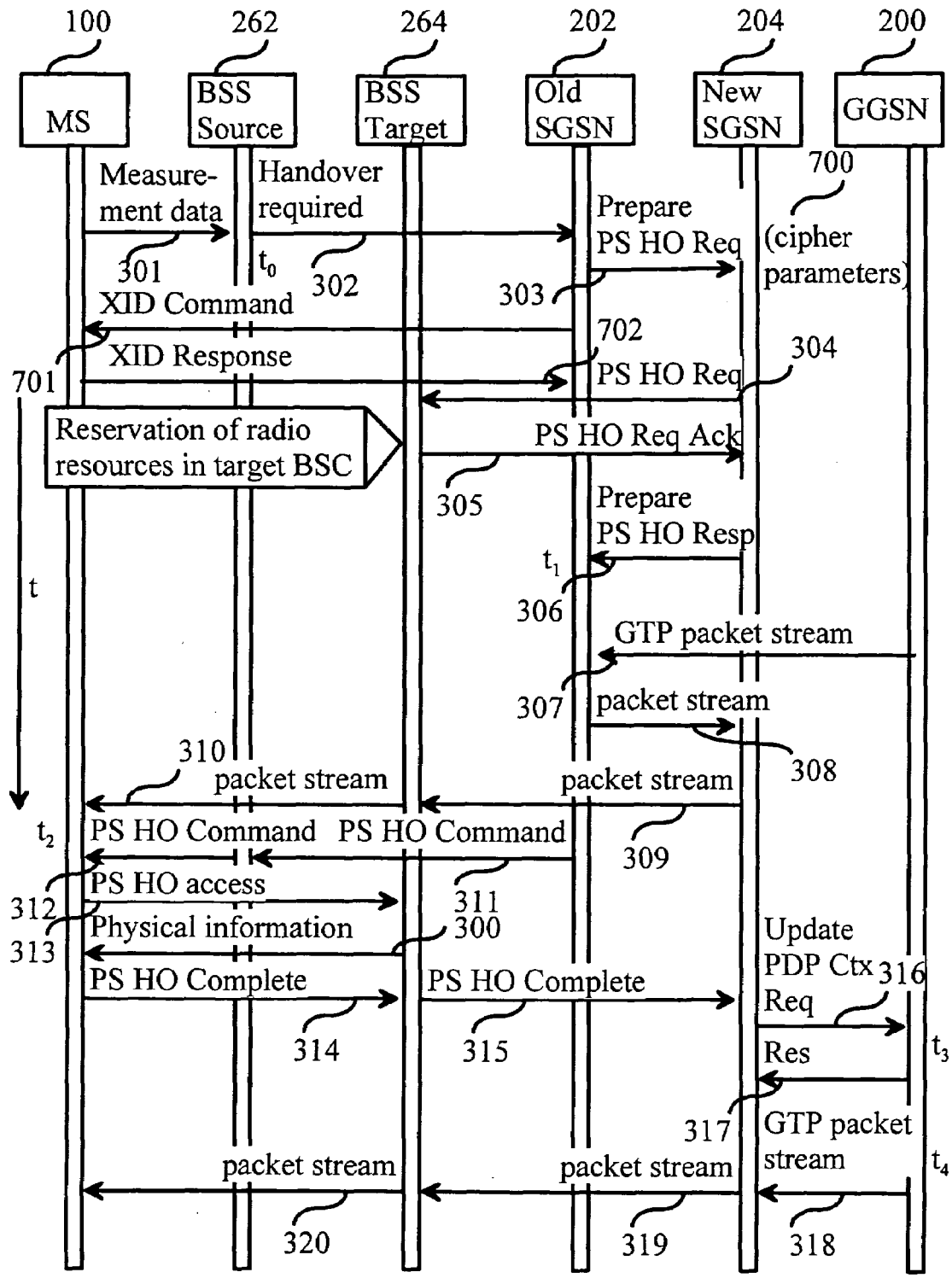
FIG. 7 is a signaling diagram depicting one embodiment of packet switched handover method utilizing logical link parameter reset, according to the invention.
Figure 12:
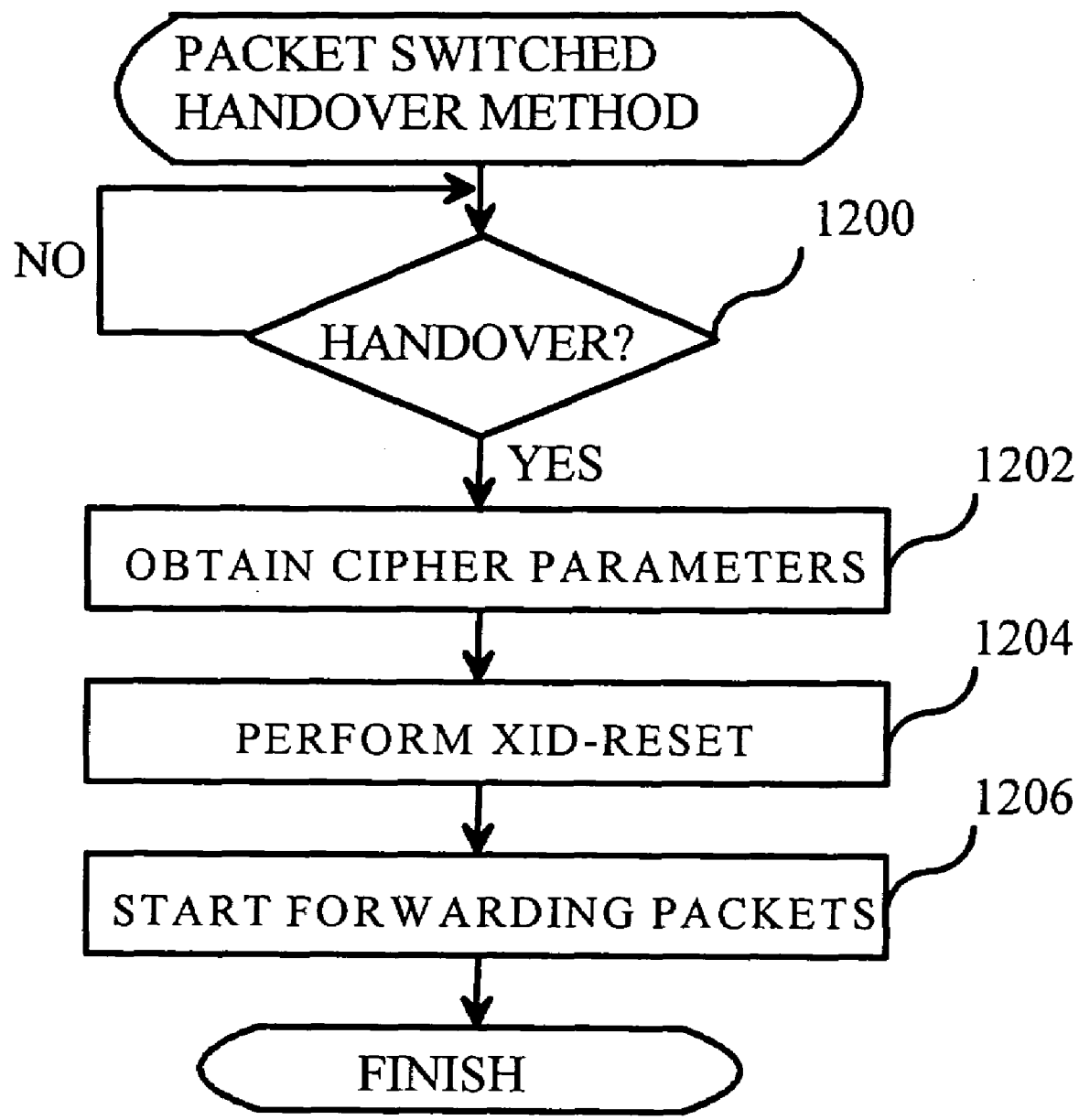
FIG. 12 is a flow chart depicting one embodiment of packet switched handover method utilizing logical link reset, according to the invention.

FIG. 12 is a flow chart depicting one embodiment of packet switched handover, which utilizes logical link reset achieved using a signaling illustrated in FIG. 7. The signaling is performed in GPRS system architecture, which is illustrated in FIG. 2. At step 1200 it is checked if handover occurs. In case there is handover MS 100 sends radio quality measurement information pertaining to neighboring cells to source BSS 262 using message 301. Based on the measurement information source BSS 262 determines that handover is required. The determination is performed using an algorithm that is executed in a Base Station Controller (BSC) within the source BSS 262. At time $t_0$ source BSS 262 determines that handover is to be performed to a new cell, which is in the area of a new SGSN, which is SGSN 204. Source BSS 262 sends a PS Handover Required message 302 to SGSN 202. The message comprises, for instance, the source cell, the target cell, TLLI, cause and a transparent container. SGSN 202 determines based on the target cell if the handover is an intra- or inter-SGSN handover. SGSN 202 determines the identity of a new SGSN, which in this case is SGSN 204, and sends a Prepare PS Handover Request message 303 to SGSN 204.

At step 1202 cipher parameters pertaining to the logical link are obtained by the LLC-entity in SGSN 204. This is achieved so that Prepare PS Handover Request message carries cipher parameter information element 700. Information element 700 comprises, for example, the session key $K_c$ and any other parameters not re-negotiated at during XID-reset procedure. At step 1204 SGSN 202 starts XID-reset procedure so that LLC-entity 252 in SGSN 202 sends an XID command message 701 to MS 100 via source BSS 262. XID command message 701 includes information on LLC parameters such as, for example, LLC version number, IOV values, retransmission timeout, maximum number of retransmissions, maximum information field lengths in the two acknowledgement modes, frame buffer sizes in uplink and downlink direction, window sizes in uplink and downlink directions and layer-3 parameters. XID command message 701 proposes LLC parameter values that correspond to initial LLC values set when a new SGSN initializes its LLC-entity. At the receipt of XID command message 701, MS 100 sets LLC parameters to the values proposed and issues XID response message 702 acknowledging the proposed parameter values. In one embodiment of the invention MS 100 is configured to accept the parameters proposed by SGSN 202 automatically when it is aware that a handover process is pending. In one embodiment of the invention MS 100 accepts a downlink PDU automatically from SGSN 204 if it is flagged accordingly and if it is received during handover.

At step 1206 SGSN 204 starts receiving packets forwarded from SGSN 202. In FIG. 7 such packets are carried in packet stream 308. SGSN 204 initializes its LLC-entity 254 to have initial LLC parameter values. The initial values correspond to the LLC-parameter values negotiated between SGSN 202 and MS 100 during XID-reset procedure at step 1204. Thereupon, SGSN 204 starts sending the forwarded packets towards MS 100. Afterwards, SGSN 204 and MS 100 may negotiate more optimal LLC parameters. Typically the re-negotiation of LLC parameters is performed after routing area update.

Figure 8:
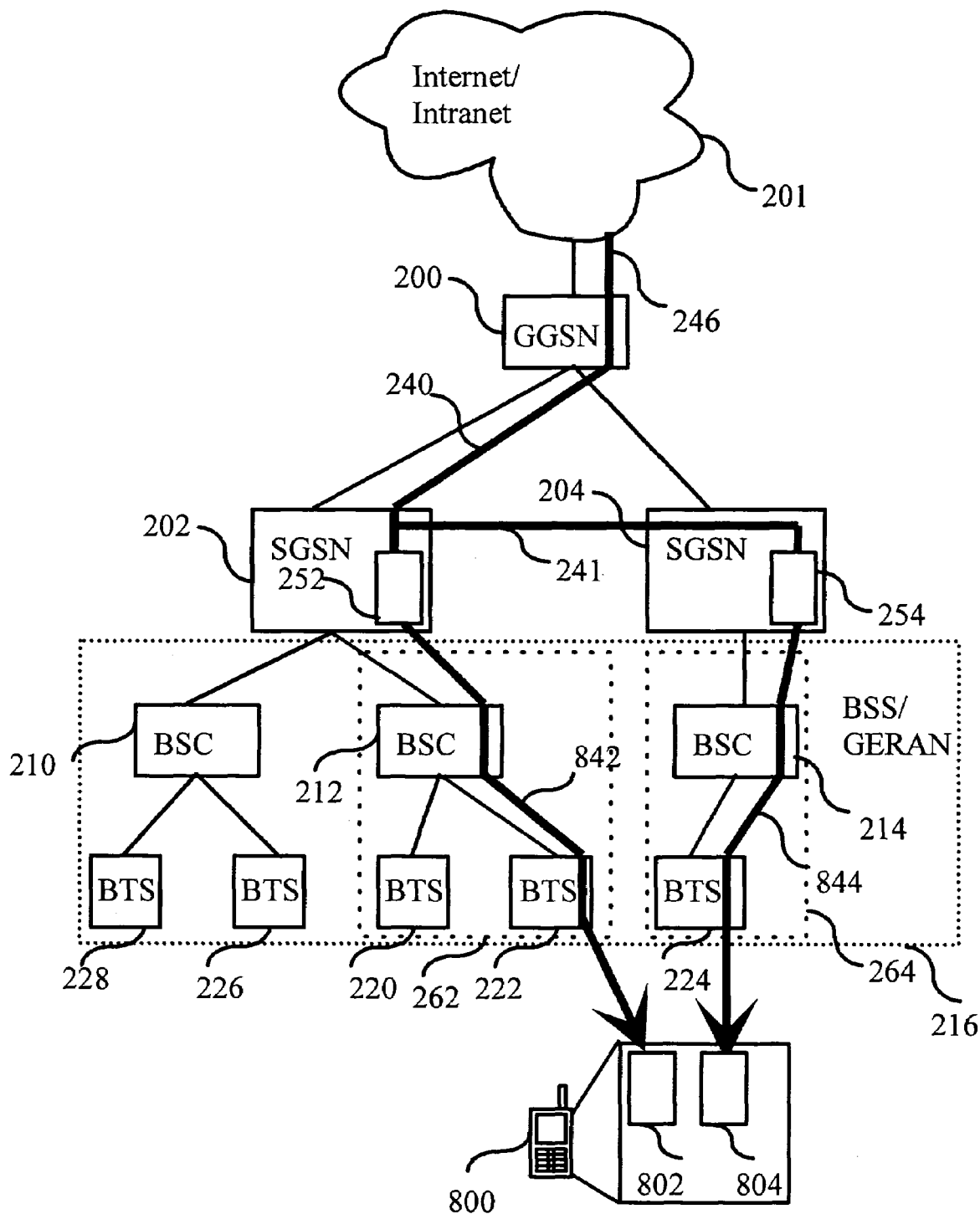
FIG. 8 is a block diagram depicting one embodiment of packet switched handover method utilizing duplicate logical link control entities, according to the invention.
Figure 13:
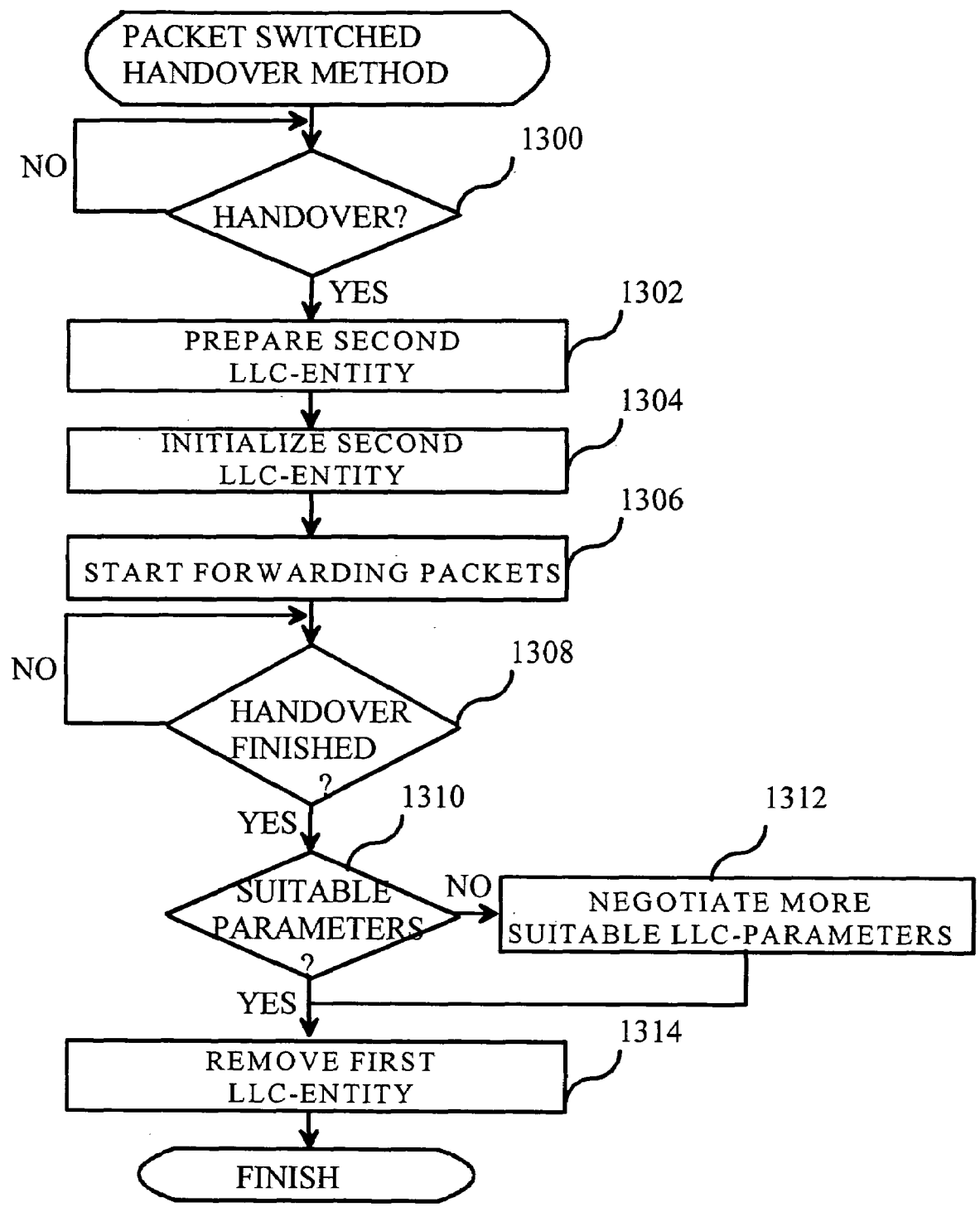
FIG. 13 is a flow chart depicting one embodiment of packet switched handover method utilizing duplicate logical link control entities, according to the invention.

FIG. 13 is a flow chart depicting one embodiment of packet switched handover, which utilizes illustrated in FIG. 8. At step 1300 MS 800 has only one LLC-entity, which is first LLC-entity 802. First LLC-entity 802 is the peer entity for LLC-entity 252 in SGSN 202. There is an LLC connection 842 between LLC-entities 252 and 802. LLC connection 842 carries a packet stream originating from GGSN 200 to MS 800. MS 800 waits for a condition where handover is required. This is determined based on, for example, a handover command received from BSS 262. When the condition is detected the method continues in step 1302. At step 1302 MS 100 constructs a second LLC-entity 804, which exists simultaneously with first LLC-entity 802 at least during handover. Second LLC-entity 804 is the peer entity for LLC-entity 254 in SGSN 204. At step 1304 MS 800 initializes second LLC-entity 804. The LLC parameters are initialized to values compatible with the values to which SGSN 204 initializes the LLC parameters while it initializes LLC-entity 254 at step 1306. At step 1306 SGSN 204 receives packets forwarded from SGSN 202 via a tunneling connection 241. Tunneling connection 241 is, for example, a GTP tunnel. SGSN 204 sends the forwarded packets towards MS 800 using LLC connection 844, which it sets up between LLC-entities 254 and 804. At step 1308 MS 800 checks if handover is finished. If handover is not finished method continues at step 1308.

When the handover is finished LLC connection 842 between LLC-entities 252 and 802 is no longer used to carry LLC-frames. In one embodiment of the invention at step 1310 MS 800 checks if LLC parameters pertaining to LLC connection 844 are suitable taking into consideration, for example, the radio conditions at the cell served by BTS 224. MS 800 may also readjust the parameters depending on available memory and the data rate on LLC connection 844. In one embodiment of the invention LLC parameters at LLC-entity 254 are initialized first to moderate values, which are made suitable for most mobile stations under different radio conditions. Mobile stations may have also varying memory sizes and software versions. For example, information field lengths, frame buffer and window sizes may be first set to values lower than would otherwise be negotiated between peering LLC-entities. If MS 800 determines that LLC parameters are not suitable, it readjusts them to different values at step 1312. The parameters are to be readjusted, for example, using an XID reset procedure involving the exchanging of XID command and XID response between LLC-entities 804 and 254. If parameter values are suitable no readjusting is needed.

In one embodiment of the invention, MS 800 removes the first LLC-entity, which was used prior to handover, after the handover is complete. At step 1314 MS 800 performs the procedures necessary for removing LLC-entity 802, which is no longer used. MS 800 may also remove LLC-entity 802 directly after step 1308 before checking whether the LLC parameters are suitable. The removing of LLC-entity comprises, for example, the releasing of memory reserved for the use of LLC-entity 802 and LLC connection 842 in MS 800. Similarly, information pertaining to LLC-entity 802 and LLC connection 842 may be removed from memory tables maintained in MS 800.

Figure 9:
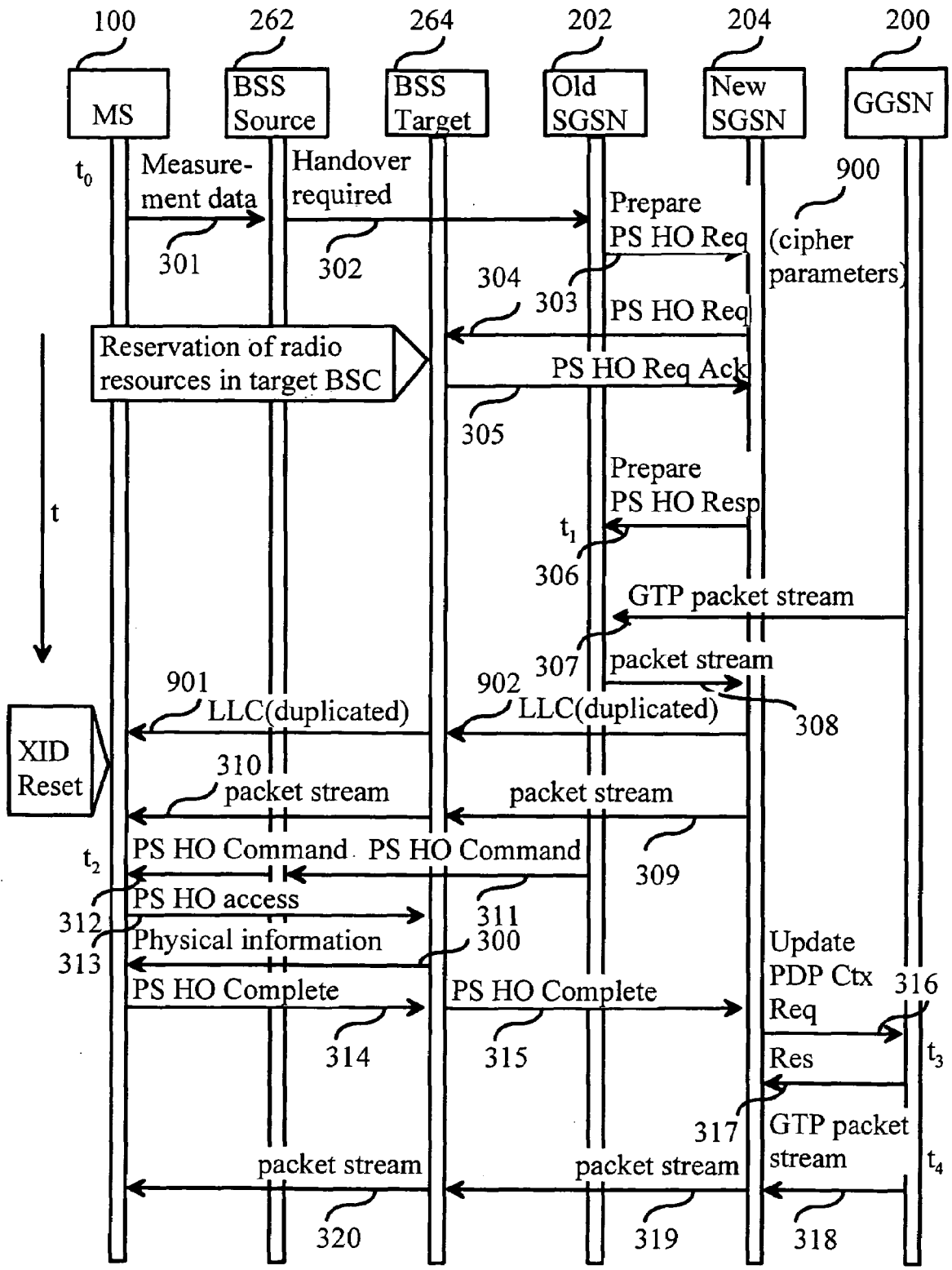
FIG. 9 is a signaling diagram depicting one embodiment of packet switched handover method utilizing a duplicate frame indicator, according to the invention.
Figure 14:
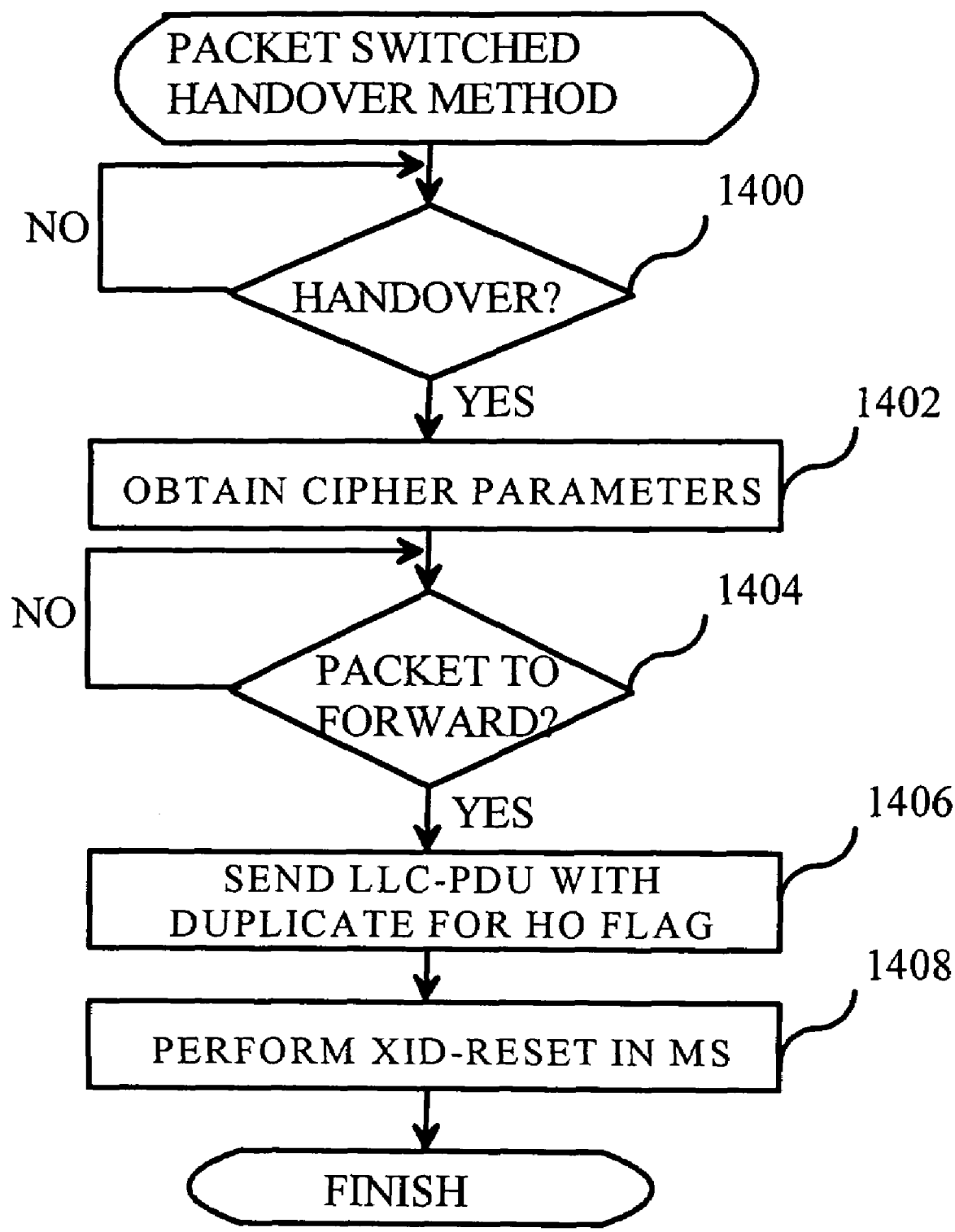
FIG. 14 is a flow chart depicting one embodiment of packet switched handover method utilizing a duplicate frame indicator, according to the invention.

FIG. 14 is a flow chart depicting one embodiment of packet switched handover method, which utilizes a duplicate frame indicator conveyed and processed using a signaling illustrated in FIG. 9. The signaling is performed in GPRS system architecture, which is illustrated in FIG. 2. At step 1400 it is checked if handover occurs. In case handover occurs MS 100 sends radio quality measurement information pertaining to neighboring cells to source BSS 262 using message 301. Based on the measurement information source BSS 262 determines that handover is required. The determination is performed using an algorithm that is executed in a Base Station Controller (BSC) within the source BSS 262. At time $t_0$ source BSS 262 determines that handover is to be performed to a new cell, which is in the area of a new SGSN, which is SGSN 204. Source BSS 262 sends a PS Handover Required message 302 to SGSN 202. The message comprises, for instance, the source cell, the target cell, TLLI, cause and a transparent container. SGSN 202 determines based on the target cell if the handover is an intra- or inter-SGSN handover. SGSN 202 determines the identity of a new SGSN, which in this case is SGSN 204, and sends a Prepare PS Handover Request message 303 to SGSN 204.

At step 1402 cipher parameters pertaining to the logical link are obtained by the LLC-entity in SGSN 204. This is achieved so that Prepare PS Handover Request message carries cipher parameter information element 900. Information element 700 comprises, for example, the session key $K_c$ and any other parameters not re-negotiated at during a XID-reset procedure.

At step 1404 SGSN 204 waits for packets forwarded from SGSN 202 to it. When such a packet is received in message 308, the method continues at step 1406. At step 1406 an SNDCP entity in SGSN 204 indicates to LLC-entity in SGSN 204 while requesting the sending of an LLC-SDU that the LLC-SDU is a first LLC-SDU comprising data from packets forwarded from SGSN 202 to SGSN 204. The LLC-PDU is therefore a duplicate of another LLC-PDU sent from SGSN 202. LLC-entity in SGSN 204 sets a duplicate for handover flag in the header of the LLC-PDU to be sent. The flag may be carried in, for example, in one of the reserved bits in LLC address field or in one of the UI control field bits. Therefore, no extra bits are needed in LLC-PDU header. LLC parameters are set to default handover values. The default values may be standardized so that optimization is maximized or normal default values are used. When MS 100 receives the LLC-PDU in an LLC frame, it detects that the duplicate for handover bit is set. At step 1408 MS performs implicit XID-reset for the LLC-entity in it. In implicit XID-reset the MS 100 sets automatically the LLC parameters to values, which are compatible with values set by LLC-entity in SGSN 204 when it is first created and initialized. Implicit XID-reset is required in MS 100 before it is able to process any LLC frames from SGSN 204. For example, this is due to the differing ciphering parameters, for example overflow count, which have not been received at step 1402.

Figure 15:
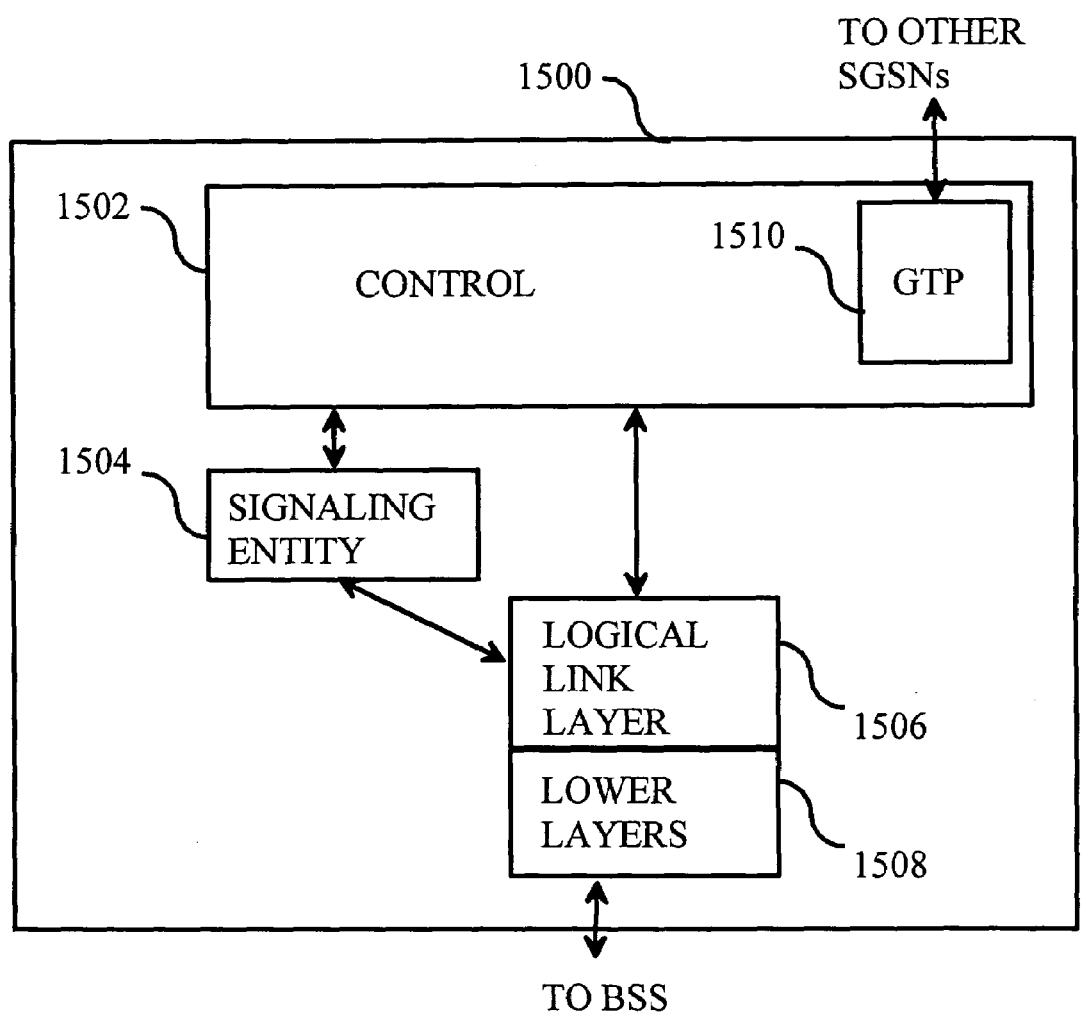
FIG. 15 illustrates a Serving GPRS Support Node (SGSN) in one embodiment of the invention.

FIG. 15 illustrates a Serving GPRS Support Node (SGSN) in one embodiment of the invention. SGSN 1500 comprises a signaling entity 1504, which communicates with a logical link layer entity 1506. Signaling entity 1504 performs GPRS control plane signaling. Logical link layer entity 1506 carries both control plane and user plane messages as specified in 3GPP 23.060 pertaining to LLC. In the embodiment of the invention disclosed in association with the description of FIGS. 6 and 11 logical link layer entity 1506 is responsible for forming logical link layer Protocol Data Units (PDU) and sending the logical link layer Protocol Data Units (PDU) to new SGSN. In one embodiment of the invention the sending of the logical link layer PDUs to new SGSN is achieved so that logical link layer entity 1506 passes the PDUs to control entity 1502, which sends them via, for example, a GTP entity 1510 to the new SGSN. In one embodiment of the invention signaling entity 1504 is responsible for detecting handover conditions, requesting handover preparation from other SGSNs, receiving handover preparation requests from other SGSNs, sending logical link layer state information, ciphering parameters and other information to other SGSNs. In one embodiment of the invention, the actual mobility management and radio related application procedures associated with signaling messages received to signaling entity 1504 are performed by control entity 1502 or by a separate control entity within signaling entity 1504. In one embodiment of the invention control entity 1502 is responsible, for example, for setting the state in logical link layer entity 1506 based on logical link layer information received from another SGSN and sending logical link layer frames to mobile node during handover. The actual sending of logical link layer frames is performed via lower protocol layers 1508. The arrows in FIG. 15 illustrate directions of information flows between the entities within SGSN 1500.

Figure 16:
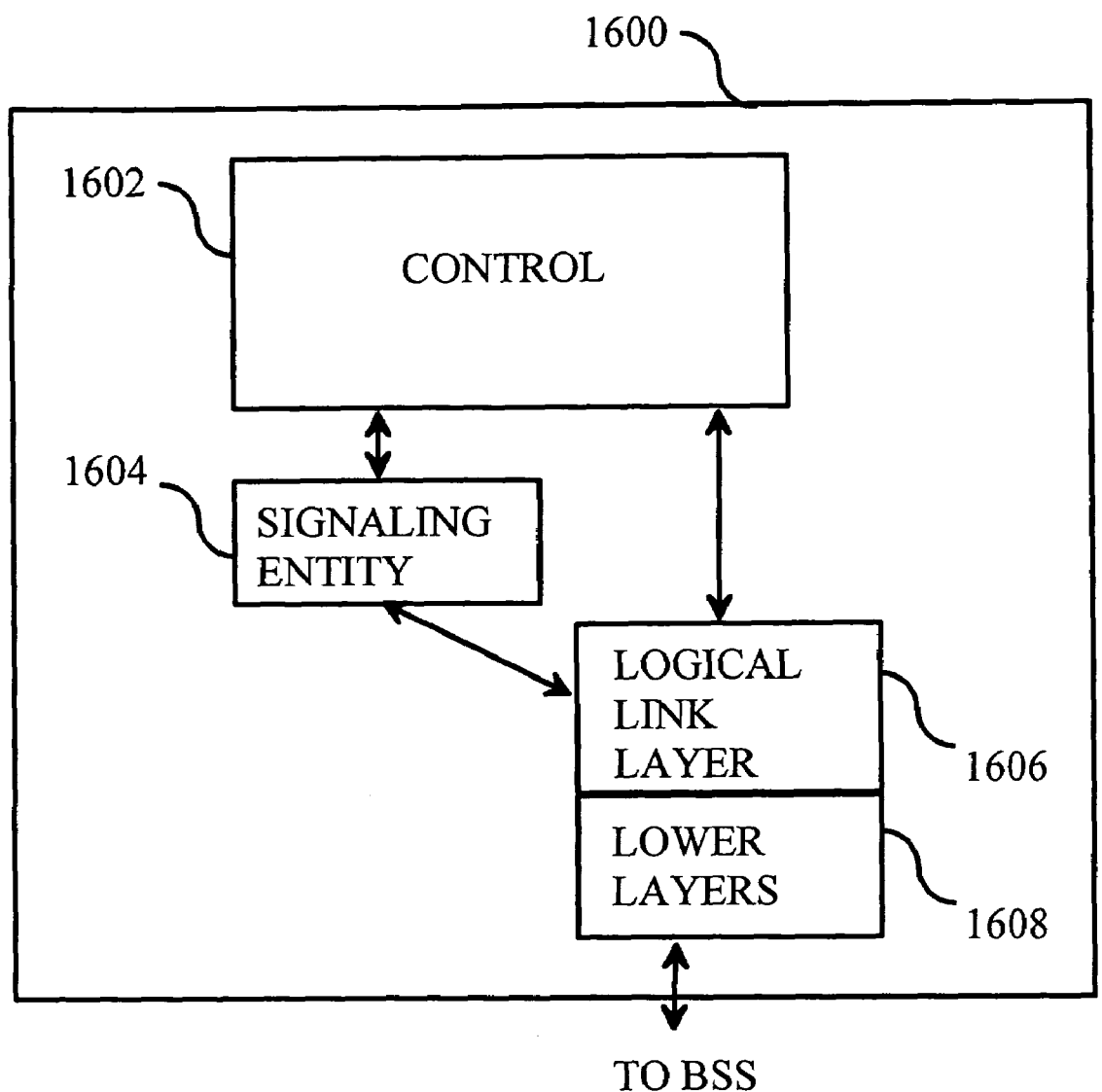
FIG. 16 illustrates a mobile node in one embodiment of the invention.

FIG. 16 illustrates a mobile node in one embodiment of the invention. In FIG. 16 mobile node is more specifically a GPRS mobile terminal. Mobile node 1600 comprises a signaling entity 1604, which communicates with a logical link layer entity 1606. Logical link layer entity 1606 carries both control plane and user plane messages as specified in 3GPP 23.060. In one embodiment of the invention signaling entity 1604 is responsible for receiving signaling messages from the base station subsystem and detects handover conditions and handover completion based on received signaling messages. Logical link layer entity 1606 performs the Logical Link Control (LLC) protocol related tasks. In the embodiment of the invention disclosed in association with the description of FIG. 12 logical link layer entity 1606 is arranged to renegotiate logical link layer parameters with new SGSN after the handover completion. Mobile station 1600 comprises also a control entity 1602, which performs higher protocol layer related tasks and overall coordination of communication. In one embodiment of the invention control entity 1602 is arranged to form a first logical link layer entity during connection establishment procedure and a second logical link layer entity in response to a handover condition. The arrows in FIG. 15 illustrate directions of information flows between the entities within mobile node 1600.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method of performing packet switched handover in a mobile communication network, the method comprising:
   detecting a handover condition associated with a mobile node in a first packet switching node;
   requesting handover preparation by said first packet switching node from a second packet switching node;
   receiving logical link layer information from said first packet switching node to said second packet switching node;
   setting a state in a logical link layer entity in said second packet switching node based on said logical link layer state information; and
   sending logical link layer frames from said first and second packet switching nodes to said mobile node during the handover.

2. The method according to claim 1, further comprising:
   utilizing a general packet radio service (GPRS) network as said mobile communication network, serving GPRS support nodes (SGSN) as said first and second packet switching nodes, and GPRS logical link control (LLC) as said logical link layer.

3. A method of performing packet switched handover in a mobile communication network, the method comprising:
   detecting a handover condition associated with said mobile node in a first packet switching node;
   requesting handover preparation by said first packet switching node from a second packet switching node;
   receiving a packet at said first packet switching node;
   forming a logical link layer protocol data unit (PDU) from data in said packet;
   sending a first frame containing said logical link layer protocol data unit (PDU) to said mobile node from said first packet switching node;
   sending said logical link protocol data unit (PDU) from said first packet switching node to said second packet switching node; and
   sending a second frame containing said logical link layer protocol data unit (PDU) to said mobile node from said second packet switching node.

4. The method according to claim 3, further comprising the step of:
   utilizing a general packet radio service (GPRS) network as said mobile communication network, Serving GPRS support nodes (SGSN) as said first and second packet switching nodes, and GPRS logical link control (LLC) as said logical link layer.

5. The method according to claim 3, further comprising:
   utilizing a general packet radio service (GPRS) network as said mobile communication network, a serving GPRS support node (SGSN) as said first packet switching node, a base station subsystem (BSS) node as said second packet switching node, and GPRS logical link control (LLC) as said logical link layer.

6. A method of performing packet switched handover in a mobile communication network, the method comprising:
   detecting a handover condition associated with a mobile node in a first packet switching node;
   requesting handover preparation by said first packet switching node from a second packet switching node;
   receiving at least one ciphering parameter from said first packet switching node to said second packet switching node;
   performing a logical link parameter exchange between said mobile node and said first packet switching node; and
   sending logical link layer frames from said first and second packet switching nodes to said mobile node during handover.

7. The method according to claim 6, wherein, in said performing step, said logical link parameter exchange is performed in response to a condition where said mobile node receives a logical link layer frame, which has a duplicate flag set.

8. The method according to claim 6, further comprising:
   utilizing a general packet radio service (GPRS) network as said mobile communication network, serving GPRS support nodes (SGSN) as said first and second packet switching nodes, GPRS logical link control (LLC) as said logical link layer, and logical link control (LLC) exchange identification (XID) negotiation as said logical link parameter exchange.

9. A method of performing packet switched handover in a mobile communication network, the method comprising:
   forming a first logical link layer entity in a mobile node;
   detecting a handover condition in said mobile node;
   forming a second logical link layer entity in said mobile node;
   sending logical link layer frames from a first and a second packet switching nodes to said mobile node during handover;
   detecting handover completion; and
   renegotiating logical link layer parameters between said mobile node and said second packet switching node after said detecting of said handover completion when the logical link layer parameters are not suitable.

10. The method according to claim 9, further comprising:
    removing said first logical link layer entity in said mobile node after said detecting of handover completion.

11. The method according to claim 9, further comprising:
utilizing a general packet radio service (GPRS) network as said mobile communication network, serving GPRS support nodes (SGSN) as said first and second packet switching nodes, and GPRS logical link control (LLC) as said logical link layer.

12. A system comprising a mobile node, a first and a second packet switching node, the system further comprising:
first signaling means in said first packet switching node for detecting a handover condition associated with said mobile node, requesting handover preparation from said second packet switching node and sending logical link layer information to said second packet switching node;
second signaling means in said second packet switching node for receiving logical link layer information from said first packet switching node;
first control means in said second packet switching node arranged for setting the state in a logical link layer entity based on logical link layer information from said first packet switching node; and
second control means in said first packet switching node arranged for sending logical link layer frames to said mobile node during handover.

13. A system comprising a mobile node, a first and a second packet switching node, the system further comprising:
signaling means in said first packet switching node for detecting a handover condition associated with said mobile node and requesting handover preparation from said second packet switching node;
first logical link layer means in said first packet switching node for forming logical link layer protocol data units (PDU) and sending said logical link layer protocol data units (PDU) to said second packet switching node; and
second logical link layer means in said second packet switching node for sending said logical link layer protocol data units (PDU) transparently to said mobile node.

14. A system comprising a mobile node, a first and a second packet switching node, the system further comprising:
first signaling means in said first packet switching node for detecting a handover condition associated with said mobile node, requesting handover preparation from said second packet switching node and sending at least one ciphering parameter to said second packet switching node;
second signaling means in said second packet switching node for receiving at least one ciphering parameter from said first packet switching node; and
logical link layer means in said first packet switching node for performing a logical link parameter exchange with said mobile node.

15. A system comprising a mobile node, a first and a second packet switching node, the system further comprising:
control means in said mobile node arranged for forming a first logical link layer entity in response to connection establishment and a second logical link layer entity in response to a handover condition;
signaling means in said mobile node for detecting the handover condition and a handover completion; and
logical link layer means in said mobile node arranged for renegotiating logical link layer parameters with said second packet switched node after the handover completion when the logical link layer parameters are not suitable.

16. A system comprising a mobile node, a first and a second packet switching node, the system further comprising:
a transceiver in said first packet switching node configured to detect a handover condition associated with said mobile node, requesting handover preparation from said second packet switching node and send logical link layer information to said second packet switching node;
a receiver in said second packet switching node configured to receive logical link layer information from said first packet switching node;
a first controller in said second packet switching node configured to set the state in a logical link layer entity based on logical link layer information from said first packet switching node; and
a second controller in said first packet switching node configured to send logical link layer frames to said mobile node during handover.

17. A system comprising a mobile node, a first and a second packet switching node, the system further comprising:
a transceiver in said first packet switching node configured to detect a handover condition associated with said mobile node and request handover preparation from said second packet switching node;
a first logical link layer in said first packet switching node configured to form logical link layer protocol data units (PDU) and sending said logical link layer protocol data units (PDU) to said second packet switching node; and
second logical link layer in said second packet switching node for sending said logical link layer protocol data units (PDU) transparently to said mobile node.

18. A system comprising a mobile node, a first and a second packet switching node, the system further comprising:
a transceiver in said first packet switching node configured to detect a handover condition associated with said mobile node, request handover preparation from said second packet switching node and send at least one ciphering parameter to said second packet switching node;
a receiver in said second packet switching node configured to receive at least one ciphering parameter from said first packet switching node; and
a logical link layer in said first packet switching node for performing a logical link parameter exchange with said mobile node.

19. A system comprising a mobile node, a first and a second packet switching node, the system further comprising:
a controller in said mobile node configured to form a first logical link layer entity in response to connection establishment and a second logical link layer entity in response to a handover condition;
a detector in said mobile node configured to detect the handover condition and a handover completion; and
a logical link layer in said mobile node configured to renegotiate logical link layer parameters with said second packet switched node after the handover completion when the logical link layer parameters are not suitable.

* * * * *